United States Patent
Rao et al.

(10) Patent No.: US 11,593,229 B2
(45) Date of Patent: Feb. 28, 2023

(54) DATA PROTECTION METHODS AND SYSTEMS FOR A NETWORKED STORAGE ENVIRONMENT

(71) Applicant: NETAPP, INC., Sunnyvale, CA (US)

(72) Inventors: Vikhyath Rao, Sunnyvale, CA (US); Nikul Y. Patel, San Jose, CA (US); Ananthan Subramanian, San Ramon, CA (US); Vijayabhaskar Rao Sirigineni, San Jose, CA (US); Vetrivelan Kaliyaperumal, San Jose, CA (US)

(73) Assignee: NETAPP, INC., San Jose, CA (US)

( * ) Notice: Subject to any disclaimer, the term of this patent is extended or adjusted under 35 U.S.C. 154(b) by 316 days.

(21) Appl. No.: 17/030,043

(22) Filed: Sep. 23, 2020

(65) Prior Publication Data

US 2022/0091943 A1 Mar. 24, 2022

(51) Int. Cl.
G06F 11/14 (2006.01)
G06F 16/21 (2019.01)
G06F 16/23 (2019.01)
G06F 16/27 (2019.01)

(52) U.S. Cl.
CPC ...... *G06F 11/1469* (2013.01); *G06F 11/1471* (2013.01); *G06F 16/219* (2019.01); *G06F 16/2358* (2019.01); *G06F 16/273* (2019.01)

(58) Field of Classification Search
CPC .. G06F 11/1469; G06F 16/273; G06F 16/219; G06F 16/2358; G06F 11/1471
See application file for complete search history.

(56) References Cited

U.S. PATENT DOCUMENTS

| 7,769,723 B2 * | 8/2010 | Zheng | G06F 16/125 707/681 |
| 7,827,350 B1 * | 11/2010 | Jiang | G06F 11/1469 707/649 |
| 7,849,057 B1 * | 12/2010 | Kazar | G06F 16/128 707/637 |
| 8,135,678 B1 * | 3/2012 | Chen | G06F 16/10 707/674 |

(Continued)

FOREIGN PATENT DOCUMENTS

| AU | 2014235433 A1 * | 10/2015 | G06F 11/1464 |
| WO | WO-2006116293 A2 * | 11/2006 | G06F 11/1435 |
| WO | WO-2016064575 A1 * | 4/2016 | G06F 16/219 |

*Primary Examiner* — Matthew M Kim
*Assistant Examiner* — Indranil Chowdhury
(74) *Attorney, Agent, or Firm* — Loza & Loza, LLP; Tejinder Singh

(57) ABSTRACT

Data protection methods and systems for a storage environment are provided. A first-in-first out (FIFO) structure stores a logical representation of a first storage location that retains previous data for a data container, after new data for the data container is stored at a second storage location. The FIFO structure also stores a logical representation of a file system tree structure that is stored in persistent storage, after a consistent point operation. In response to an event, the file system tree structure is selected, based on the file system tree structure being closest to a transaction. A snapshot is generated using the file system tree structure. Thereafter, the data container is restored from the snapshot or from a copy of the snapshot.

20 Claims, 15 Drawing Sheets

(56) References Cited

U.S. PATENT DOCUMENTS

| | | | | |
|---|---|---|---|---|
| 8,161,007 | B2* | 4/2012 | Chen | G06F 11/2066 |
| | | | | 707/648 |
| 8,396,833 | B2* | 3/2013 | Chang | G06F 16/128 |
| | | | | 707/682 |
| 10,108,647 | B1* | 10/2018 | Kumar | G06F 16/183 |
| 10,394,660 | B2* | 8/2019 | Bolen | G06F 3/061 |
| 10,417,190 | B1* | 9/2019 | Donlan | G06F 16/128 |
| 10,628,270 | B1* | 4/2020 | Bajaj | G06F 11/1471 |
| 10,963,189 | B1* | 3/2021 | Neelakantam | G06F 3/0616 |
| 2006/0224636 | A1* | 10/2006 | Kathuria | G06F 11/1471 |
| 2007/0245104 | A1* | 10/2007 | Lindemann | G06F 11/1469 |
| | | | | 711/162 |
| 2014/0279931 | A1* | 9/2014 | Gupta | G06F 16/2358 |
| | | | | 707/683 |
| 2017/0011062 | A1* | 1/2017 | Zaveri | G06F 16/2379 |
| 2021/0271659 | A1* | 9/2021 | Narasingarayanapeta | |
| | | | | G06F 11/2097 |
| 2021/0303511 | A1* | 9/2021 | Karr | G06F 16/1824 |
| 2021/0303528 | A1* | 9/2021 | Meister | G06F 16/162 |
| 2021/0334182 | A1* | 10/2021 | Kuo | G06F 11/2094 |
| 2022/0138207 | A1* | 5/2022 | Yelheri | G06F 16/219 |
| | | | | 707/722 |

* cited by examiner

DATA PROTECTION METHODS AND SYSTEMS FOR A NETWORKED STORAGE ENVIRONMENT

TECHNICAL FIELD

The present disclosure generally relates to storage systems, and more particularly, to computing technology for providing continuous data protection for data stored in networked storage systems.

BACKGROUND

Various forms of storage systems are used today. These forms include direct attached storage, network attached storage (NAS) systems, storage area networks (SANs), and others. Storage systems are commonly used for a variety of purposes, such as providing multiple users with access to shared data, backing up data and others. A storage system typically includes at least one computing system (may also be referred to as a "server", "storage server", "storage node", "storage system node" or "storage controller") executing a storage operating system configured to store and retrieve data on behalf of one or more computing systems at one or more storage devices.

Conventional data protection technology to protect stored data involves taking snapshots i.e. a point in time copy of a file system at fixed time intervals. This makes a recovery point objective (RPO) to restore a snapshot coarse grained i.e. one is only able to recover the file system only based on when the snapshot was taken. For example, assume that snapshot S1 was taken at time t1 and snapshot S2 was taken at time t2. S1 and S2 may not be taken at specific transaction boundaries i.e. after completion of a specific write operation. Conventional snapshot technology can mostly restore the file system to t1 or t2 based on S1 and S2. This does not provide continuous data protection where the file system can be efficiently restored at a specific transaction between t1 and t2.

Furthermore, conventional data protection technology for databases has shortcomings. Typically, databases use two components, a log file and a data file to track database write operations or transactions. The log file tracks all transactions, while the data file stores the data. Typically, to restore a database, one selects a snapshot and replays the log file. Because snapshots are coarse grained, one has to replay various transactions of the log file to reach a specific transaction. This may delay the restore operation and may potentially breach a recovery time objective (RTO) that provides a duration during which a database has to be restored. Continuous efforts are being made to improve computing technology for providing continuous data protection in networked storage systems.

BRIEF DESCRIPTION OF THE DRAWINGS

The various features of the present disclosure will now be described with reference to the drawings of the various aspects disclosed herein. In the drawings, the same components may have the same reference numerals. The illustrated aspects are intended to illustrate, but not to limit the present disclosure. The drawings include the following Figures.

DETAILED DESCRIPTION

Figure 1A:
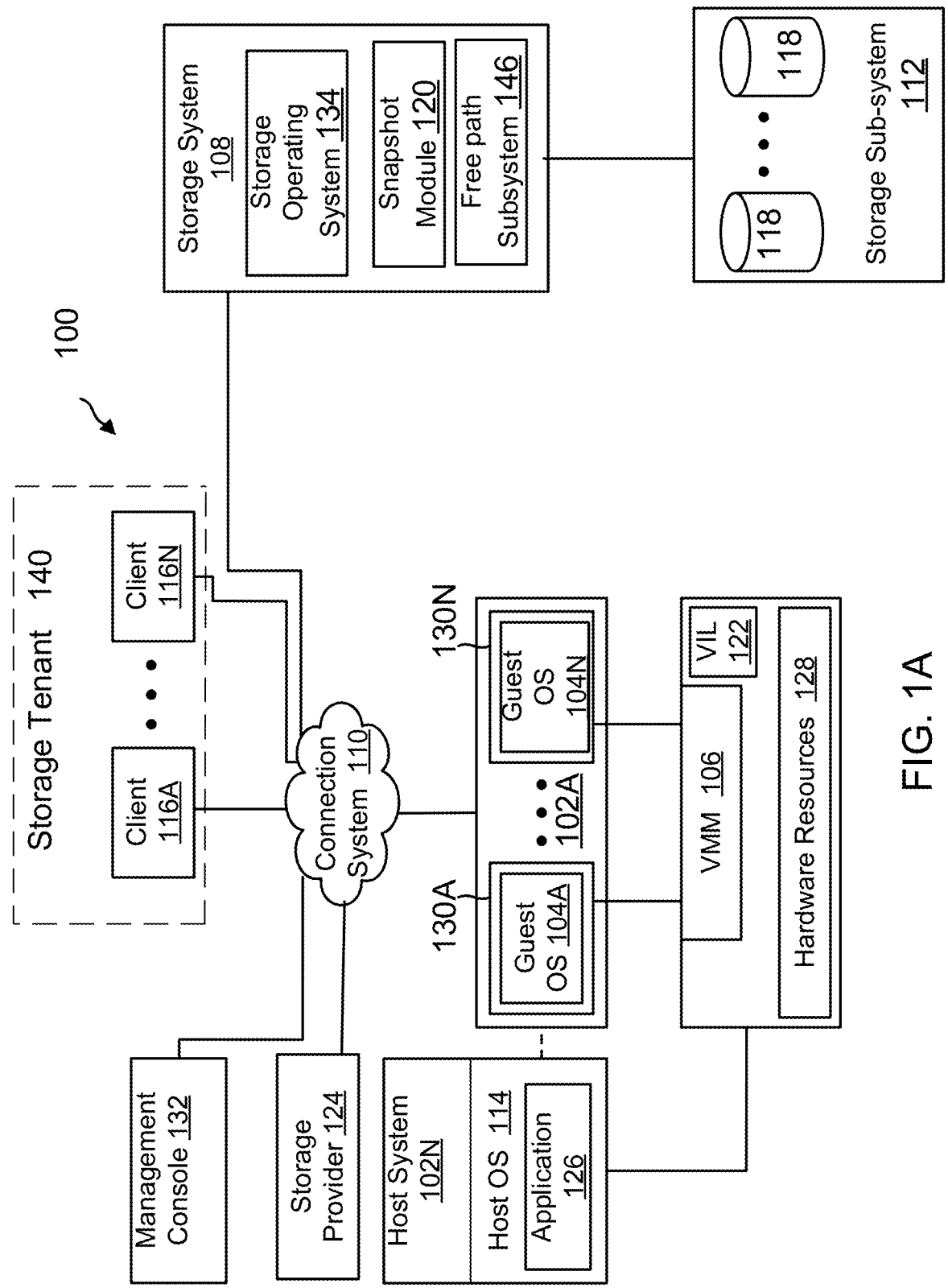
FIG. 1A shows an example of an operating environment for various aspects of the present disclosure.

As a preliminary note, the terms "component", "module", "system," and the like as used herein are intended to refer to a computer-related entity, either software-executing general-purpose processor, hardware, firmware and a combination thereof. For example, a component maybe, but is not limited to being, a process running on a hardware processor, a hardware processor, an object, an executable, a thread of execution, a program, and/or a computer.

By way of illustration, both an application running on a server and the server can be a component. One or more components may reside within a process and/or thread of execution, and a component can be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer readable media including, but not limited to, an ASIC (application specific integrated circuit), CD (compact disc), DVD (digital video disk), ROM (read only memory), floppy disk, hard disk, storage class memory, solid state drive or any other non-volatile memory, EEPROM (electrically erasable programmable read only memory), memory stick or any other storage device type, in accordance with the claimed subject matter.

In one aspect, innovative computing technology is disclosed that efficiently takes snapshots and restores data containers, including databases, with shortened recovery times. As described below in detail, the disclosed technology enables quick access to data containers that existed within a system, prior to a ransomware attack. In another aspect, when a primary storage system is synchronized with a secondary storage system (i.e. data stored by the primary storage system is synchronized (or mirrored/replicated) at the secondary storage system), and if there is disruption in the synchronization process, the technology disclosed herein quickly provides access to data, prior to the disruption.

In one aspect, a first-in-first out (FIFO) structure is provided for a storage volume (described below). The FIFO structure stores pointers to storage locations whose data has been previously modified (i.e. overwritten at new storage locations) and pointers to consistent point file system structures that are close to transaction boundaries. A transaction boundary is defined by a write operation. By retaining the data that was previously modified and the consistent point file system structures, the FIFO structure enables a client system to select a file system structure that is either at a transaction boundary or close to the transaction boundary. A snapshot of the selected file system structure is then taken, and the file system can be efficiently restored to a specific transaction. As described below in more detail, using the FIFO structure, the system provides continuous data protection, vis-à-vis conventional technology that relies on schedule based snapshots.

System 100: FIG. 1A shows an example of a networked storage environment 100 (also referred to as system 100), for implementing the various adaptive aspect of the present disclosure. System 100 may include a plurality of computing devices 102A-102N (may also be referred to as a "host system 102," "host systems 102", "computing device 102", "computing devices 102", "server 102" or "servers 102") communicably coupled via a connection system 110 (e.g. a local area network (LAN), wide area network (WAN), the Internet and others) to a storage system 108 (may also be referred to as "storage server 108", "storage controller 108", "storage node 108", "storage nodes 108", "storage system node 108" or "storage system nodes 108") that executes a storage operating system 134 for storing and retrieving data to and from a storage subsystem 112 having mass storage devices 118. As used herein, the term "communicably coupled" may refer to a direct connection, a network connection, or other connections to enable communication between devices.

In one aspect, the storage operating system 134 interfaces with or includes a snapshot module 120 for taking snapshots (or backups), as described below in detail. The storage operating system 134 also interfaces with or includes a free path subsystem 146 for managing free storage blocks, also described below in detail. The term snapshot means a "point in time" copy of an active file system that uses storage volumes/logical unit numbers (LUNs) for storing data. The snapshot is a persistent, point in time (PPT) image of the active file system. The snapshot includes metadata that provides a snapshot identifier, a size of the snapshot, a volume identifier that identifies a volume associated with the snapshot, a timestamp indicating when the snapshot was taken, and other information.

As an example, host system 102A may execute a plurality of virtual machines (VMs) in a virtual environment that is described below in detail. Host 102N may execute one or more application 126, for example, a database application, an email application or any other application type to use the storage system 108 for storing information in storage devices 118. It is noteworthy that although the various aspects of the present disclosure are described below with respect to a database application, referring application 126 to as database application 126, the adaptive aspects are not limited to database applications. Host 102N also executes an operating system 114, for example, a Windows based operating system, Linux, Unix and others (without any derogation of any third-party trademark rights) to control the overall operations of host 102N.

Clients 116A-116N are computing devices that can access storage space at the storage system 108 via the connection system 110. A client can be the entire system of a company, a department, a project unit or any other entity. Each client is uniquely identified and, optionally, may also be a part of a logical structure called a storage tenant 140. The storage tenant 140 represents a set of users (may also be referred to as storage consumers) for a storage provider 124 (may also be referred to as a cloud manager, where cloud computing is utilized) that provides access to storage system 108. It is noteworthy that the adaptive aspects of the present disclosure are not limited to using a storage provider or a storage tenant, and instead, can be implemented for direct client access.

In one aspect, the storage operating system 134 has access to storage devices 118 of the storage subsystem 112. The storage devices 118 may include solid state drives (SSDs), storage class memory, writable storage device media such as hard disk drives (HDD), magnetic disks, video tape, optical, DVD, magnetic tape, and/or any other similar media adapted to store electronic information. The storage devices 118 can be organized as one or more groups of Redundant Array of Independent (or Inexpensive) Disks (RAID). The various aspects disclosed are not limited to any specific storage device type or storage device configuration.

As an example, the storage operating system 134 may provide a set of logical storage volumes (or LUNs)) that present storage space to host systems 102, clients 116, and/or VMs (e.g. 130A/130N, described below) for storing information. Each volume can be configured to store data containers (e.g. files, directories, structured or unstructured data, or data objects), scripts, word processing documents, executable programs, and any other type of structured or unstructured data. From the perspective of one of the client systems, each volume can appear to be a single drive. However, each volume can represent storage space at one storage device, an aggregate of some or all of the storage space in multiple storage devices, a RAID group, or any other suitable set of storage space. The term file/files as used herein include data container/data containers, directory/directories, and/or data object/data objects with structured or unstructured data.

In one aspect, storage operating system 134 is a write anywhere file system (WAFL). A WAFL type operating system does not rewrite a block, instead, allocates a new block for each rewrite operation, i.e. a new block is allocated for each write operation. The various aspects disclosed herein are not limited to any specific file system type and can be implemented by other file systems and storage operating systems.

The storage operating system 134 organizes storage space at the storage subsystem 112 as one or more "aggregate", where each aggregate is identified by a unique identifier and a location. Within each aggregate, one or more storage volumes are created whose size can be varied. A qtree, sub-volume unit may also be created within the storage volumes. As a special case, a qtree may also be an entire storage volume.

The storage system 108 can be used to store and manage information at storage devices 118. A request to store or read data can be based on file-based access protocols, for example, the Common Internet File System (CIFS) protocol or Network File System (NFS) protocol, over TCP/IP (Transmission Control Protocol/Internet Protocol). Alternatively, the request may use block-based access protocols, for example, iSCSI (Internet Small Computer Systems Interface) and SCSI encapsulated over Fibre Channel (FCP).

To facilitate access to storage space, the storage operating system 134 implements a file system (also referred to as file system manager 240, FIG. 2B) that logically organizes stored information as a hierarchical structure for files/directories/objects at the storage devices. Each "on-disk" file can be implemented as a set of data blocks configured to store information, such as text, whereas a directory can be implemented as a specially formatted file in which other files and directories are stored. The data blocks are organized within a volume block number (VBN) space that is maintained by the file system. The file system may also assign each data block in the file a corresponding "file offset" or file block number (FBN). The file system typically assigns sequences of FBNs on a per-file basis, whereas VBNs are assigned over a larger volume address space. The file system organizes the data blocks within the VBN space as a logical volume. The file system typically may include a contiguous range of VBNs from zero to n, for a file system of size n−1 blocks.

The storage operating system 134 may further implement a storage module (for example, a RAID system for the storage subsystem 112) that manages the storage and retrieval of the information to and from storage devices 118 in accordance with input/output (I/O) operations. When accessing a block of a file in response to servicing a client request, the file system specifies a VBN that is translated at the file system/RAID system boundary into a disk block number ("DBN") (or a physical volume block number ("PVBN") location on a particular storage device (storage device, DBN) within a RAID group of the physical volume).

A requested block is retrieved from one of the storage devices 118 and stored in a buffer cache (e.g. 140, FIG. 5A) of a memory of the storage system 108 as part of a buffer tree (e.g. 400, FIG. 4) of a data container. The buffer tree is an internal representation of blocks for a file stored in the buffer cache and maintained by the file system manager. Broadly stated and as described below in detail, the buffer tree has an inode at the root (top-level) of the file.

An inode is a data structure used to store information, such as metadata, about a file, whereas the data blocks are structures used to store the actual data for the file. The information in an inode may include, e.g., ownership of the file, file modification time, access permission for the file, size of the file, file type and references to locations on storage devices 118 of the data blocks for the file. The references to the locations of the file data are provided by pointers, which may further reference indirect blocks (e.g. 404, FIG. 4) that, in turn, reference the data blocks (e.g. 406, FIG. 4), depending upon the amount of data in the file. Each pointer can be embodied as a YEN to facilitate efficiency among the file system and the RAID system when accessing the data.

Volume information ("volinfo") and file system information ("FSINFO") blocks (may also be referred to as "super blocks") specify the layout of information in the file system, the latter block includes an inode of a file with all other inodes of the file system (the inode file). Each logical volume (file system) has an FSINFO block that is preferably stored at a fixed location, e.g., at a RAID group. The inode of the FSINFO block may directly reference (or point to) blocks of the inode file or may reference indirect blocks of the inode file that, in turn, reference direct blocks of the inode file. Within each direct block of the inode file are embedded inodes, each of which may reference indirect blocks that, in turn, reference data blocks (also mentioned as "L0" blocks) of a file. An example of an inode and a buffer tree are described below with respect to FIG. 4.

In a typical mode of operation, a computing device (e.g. host system 102, client 116 or any other device) transmits one or more I/O requests over connection system 110 to the storage system 108. Storage system 108 receives the I/O requests, issues one or more I/O commands to storage devices 118 to read or write data on behalf of the computing device, and issues a response containing the requested data over the network 110 to the respective client system.

As mentioned above, system 100 may also include a virtual machine environment where a physical resource is time-shared among a plurality of independently operating processor executable virtual machines (VMs). Each VM may function as a self-contained platform, running its own operating system (OS) and computer executable application software. The computer executable instructions running in a VM may also be collectively referred to herein as "guest software." In addition, resources available within the VM may also be referred to herein as "guest resources."

The guest software expects to operate as if it were running on a dedicated computer rather than in a VM. That is, the guest software expects to control various events and have access to hardware resources on a physical computing system (may also be referred to as a host system) which may also be referred to herein as "host hardware resources". The host hardware resources may include one or more processors, resources resident on the processors (e.g., control registers, caches and others), memory (instructions residing in memory, e.g., descriptor tables), and other resources (e.g., input/output devices, host attached storage, network attached storage or other like storage) that reside in a physical machine or are coupled to the host system.

As shown in FIG. 1A, host system 102A includes/provides a virtual machine environment executing a plurality of VMs 130A-130N (also referred to as VM 130 or VMs 130) that can be presented to client computing devices/systems 116A-116N. VMs 130 execute a plurality of guest OS 104A-104N (may also be referred to as guest OS 104) that share hardware resources 128. Application 126 (also referred to as database application 126) may also be executed within VMs 130 to access the storage system 108. As described above, hardware resources 128 may include storage, CPU, memory, I/O devices or any other hardware resource.

In one aspect, host system 102A interfaces with or includes a virtual machine monitor (VMM) 106, for example, a processor executed Hyper-V layer provided by Microsoft Corporation, a hypervisor layer provided by VMWare Inc., or any other type (without derogation of any third party trademark rights). VMM 106 presents and manages the plurality of guest OS 104A-104N executed by the host system 102A. The VMM 106 may include or interface with a virtualization layer (VIL) 122 that provides one or more virtualized hardware resource to each OS 104A-104N.

In one aspect, VMM 106 is executed by host system 102A with VMs 130. In another aspect, VMM 106 can be executed by an independent stand-alone computing system, referred to as a hypervisor server or VMM server and VMs 130 are presented at one or more computing systems.

It is noteworthy that different vendors provide different virtualization environments, for example, VMware Inc., Microsoft Corporation and others. Data centers may have hybrid virtualization environments/technologies, for example, Hyper-V and hypervisor based virtual environments. The generic virtualization environment described above with respect to FIG. 1A can be customized to implement the various aspects of the present disclosure. Furthermore, VMM 106 (or VIL 122) may execute other modules, for example, a storage driver, network interface and others. The virtualization environment may use different hardware and software components and it is desirable for one to know an optimum/compatible configuration.

In one aspect, system 100 uses a management console 132 for configuring and managing the various components of system 100. As an example, the management console 132 can be implemented as or include one or more application programming interfaces (APIs) that are used for managing one or more components of system 100. The APIs can be implemented as REST APIs, where REST means "Representational State Transfer". REST is a scalable system used for building web services. REST systems/interfaces may use HTTP (hyper-text transfer protocol) or other protocols for communicating with one or more devices of system 100.

Although storage system 108 is shown as a stand-alone system, i.e. as a non-cluster based system, in another aspect, storage system 108 may have a distributed architecture, for example, a cluster based storage system that is described below in detail with respect to FIG. 2A.

Figure 1B:
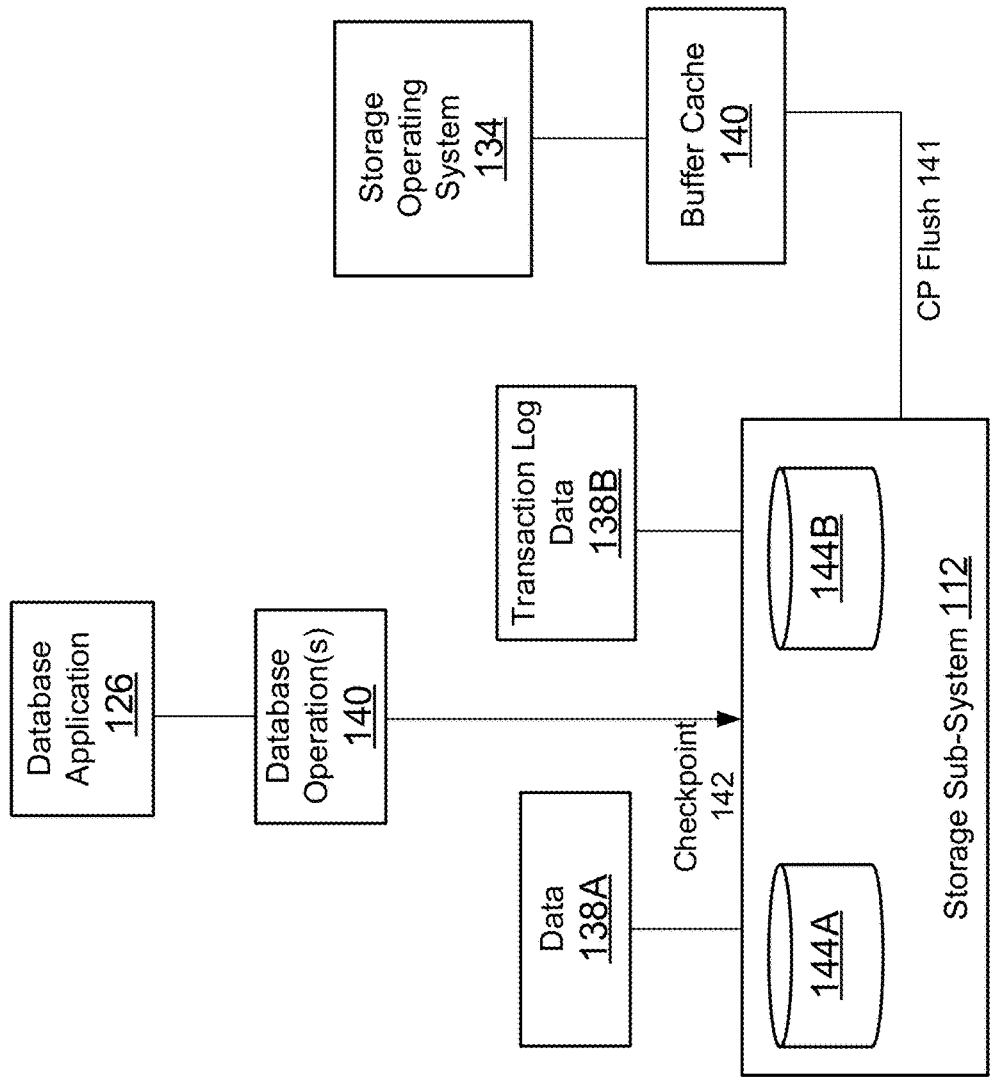
FIG. 1B shows an example of writing data by a database application, according to aspects of the present disclosure.

Database Operations: FIG. 1B shows an example of executing database operations, including write operations. As an example, database operations 140 can be generated by database application 126 executed by host system 102, described above with respect to FIG. 1A. When the database operations 140 involve a write operation, then the data 138A for the write operation is stored at a storage volume 144A, while transaction data 138B associated with the write operations can be stored at a separate volume 144B. A database checkpoint 142 operation is executed by the database application 126. During checkpoint, current in-memory modified pages (may also be referred to as "dirty pages") (i.e. 138A) and transaction log information (i.e. 138B) are written from a memory to persistent storage (e.g. storage devices 118).

The storage operating system 134 may also execute a "consistency point" ("CP") operation 141 to flush information from a buffer cache 140 to persistent storage (e.g. storage devices 118). The database checkpoint 142 and the CP operation 141 may not be synchronized i.e. they may occur at different times.

To protect databases (or any other data), backups are taken and stored at persistent storage. One technique to protect information includes taking a snapshot i.e. a point-in-time copy of a storage volume. The point-in-time copy captures all the information in a storage volume. The snapshot may then be used to restore a storage volume.

In conventional snapshot technology, to restore a database to a particular transaction or close to a specific transaction may require replaying various transaction logs because snapshots are typically taken based on a recovery point objective (RPO) based schedule. To restore to a specific transaction, one manually selects a snapshot that may have been taken close the specific transaction and then replay all the logs to restore the database close to the specific transaction. The log replay delays recovery and hence one may not be able to meet a recovery time objective (RTO).

The adaptive aspects described herein provide technology for retaining data that may have been modified. In one aspect, a FIFO structure is maintained to hold certain number of data blocks that may have been rewritten. The FIFO structure also retains a VVBN to a file system tree structure for a CP operation that was executed at a transaction boundary. By retaining this information in the FIFO structure, a file system can provide a continuous data protection window, in contrast to conventional, schedule-based, snapshot technology. The number of data blocks that can be held in the FIR) vary based on the size of the FIFO structure and the overall storage space that is made available to a client system. Details of the FIFO structure are provided below.

Clustered Storage System: Before describing the FIFO structure and its use, the following describes a clustered based networked storage environment where the innovative technology disclosed herein can be implemented. FIG. 2A shows a cluster-based, networked storage environment (may also be referred to as "storage environment") 200 with a plurality of storage system nodes (208.1-208.3) operating to store data on behalf of clients at storage devices 118.1-118.3. Storage environment 200 may include a plurality of client systems 204.1-204.N (may also be referred to as "client system 204" or "client systems 204") as part of or associated with storage tenant 140, a clustered storage system 202 (similar to the storage system 108 of FIG. 1A/1B) and at least a network 206 communicably connecting the host system 102A-102N, client systems 204.1-204.N, the management console 132, the storage (or cloud) provider 124 and the clustered storage system 202. It is noteworthy that these components may interface with each other using more than one network having more than one network device.

The clustered storage system 202 includes the plurality of storage system nodes 208.1-208.3 (also referred to as "node 208" or "nodes 208"), a cluster switching fabric 210, and a plurality of mass storage devices 118.1-118.3 (similar to 118, FIG. 1A). Each of the plurality of nodes 208.1-208.3 is configured to include a network module, a storage module, and a management module, each of which can be implemented as a processor executable module. Specifically, node 208.1 includes a network module 214.1, a storage module 216.1, and a management module 218.1, node 208.2 includes a network module 214.2, a storage module 216.2, and a management module 218.2, and node 208.3 includes a network module 214.3, a storage module 216.3, and a management module 218.3.

The network modules 214.1-214.3 include functionality that enable the respective nodes 208.1-208.3 to connect to one or more of the host systems 102A-102N, and the client systems 204.1-204.N (or the management console 132) over the network 206. The network modules 214.1-214.3 handle network file protocol processing (for example, CFS, NFS and/or iSCSI requests). The storage modules 216.1-216.3 connect to one or more of the storage devices 118.1-118.3 and process I/O requests. Accordingly, each of the plurality of nodes 208.1-208.3 in the clustered storage server arrangement provides the functionality of a storage server.

The management modules 218.1-218.3 provide management functions for the clustered storage system 202. The management modules 218.1-218.3 collect storage information regarding storage devices, such as storage devices 118.1-118.3.

A switched virtualization layer including a plurality of virtual interfaces (VIFs) 219 is provided to interface between the respective network modules 214.1-214.3 and the client systems 204.1-204.N, allowing storage space at the storage devices associated with the nodes 208.1-208.3 to be presented to the client systems 204.1-204.N as a single shared storage pool.

The clustered storage system 202 can be organized into any suitable number of storage virtual machines (SVMs) (may also be referred to as virtual servers (may also be referred to as "SVMs")), in which each SVM represents a single storage system namespace with separate network access. A SVM can be designated as a resource on system 200. Each SVM has a client domain and a security domain that are separate from the client and security domains of other SVMs. Moreover, each SVM is associated with one or more VIFs 219 and can span one or more physical nodes, each of which can hold one or more VIFs 219 and storage associated with one or more SVMs. Client systems can access the data on a SVM from any node of the clustered system, through the VIF(s) 219 associated with that SVM.

Each node 208.1-208.3 is a computing system to provide services to one or more of the client systems 204.1-204.N and host systems 102A-102N. The nodes 208.1-208.3 are interconnected by the switching fabric 210, which, for example, can be embodied as a Gigabit Ethernet switch or any other type of switching/connecting device.

Figure 2A:
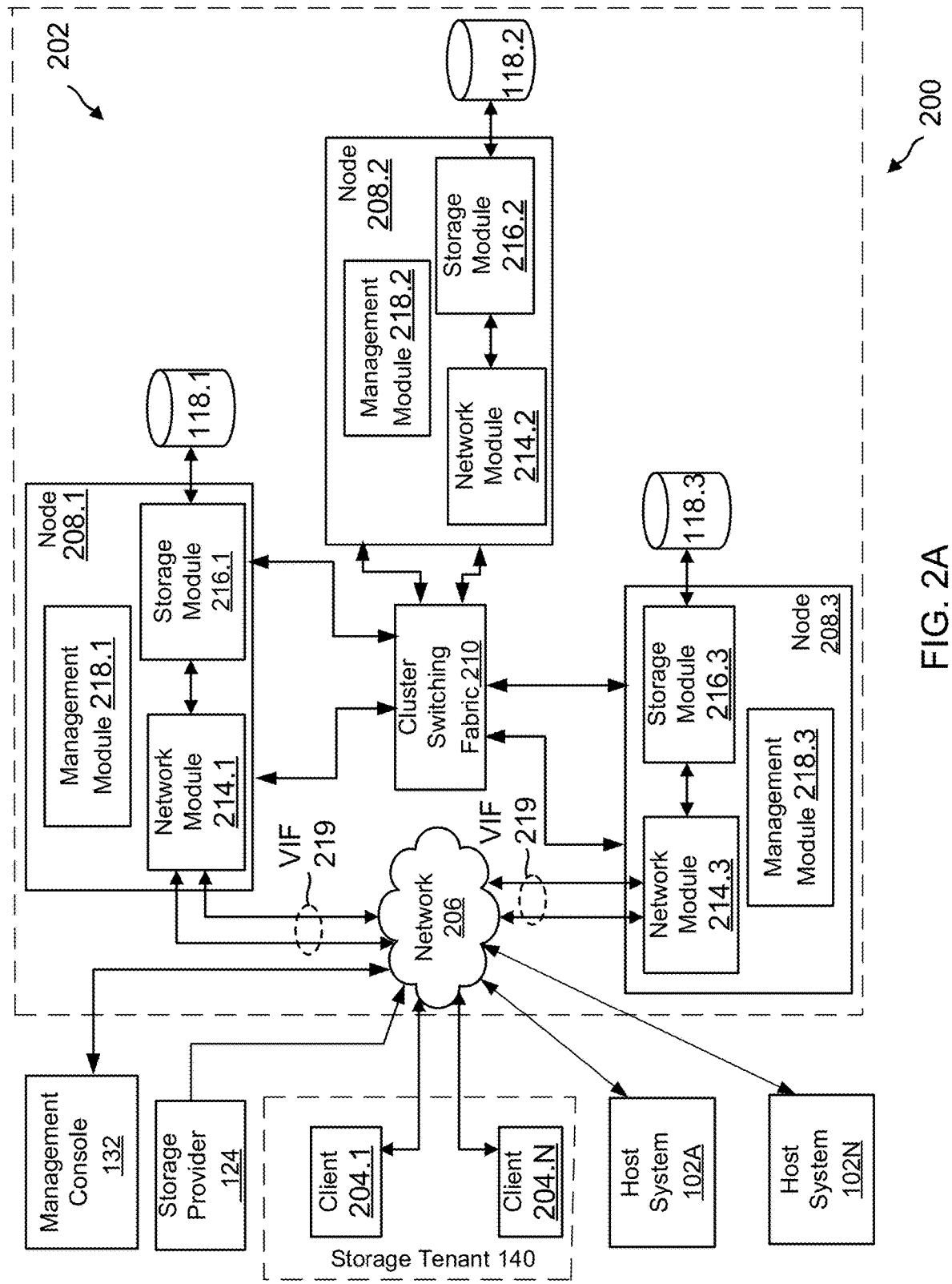
FIG. 2A shows an example of a clustered storage system with a plurality of storage system nodes, used according to aspects of the present disclosure.

Although FIG. 2A depicts an equal number (i.e., 3) of the network modules 214.1-214.3, the storage modules 216.1-216.3, and the management modules 218.1-218.3, any other suitable number of network modules, storage modules, and management modules may also be provided. There may also be different numbers of network modules, storage modules, and/or management modules within the clustered storage system 202. For example, in alternative aspects, the clustered storage system 202 may include a plurality of network modules and a plurality of storage modules interconnected in a configuration that does not reflect a one-to-one correspondence between the network modules and storage modules. In another aspect, the clustered storage system 202 may only include one network module and storage module.

Each client system 204.1-204.N may request the services of one of the respective nodes 208.1, 208.2, 208.3, and that node may return the results of the services requested by the client system by exchanging packets over the computer network 206, which can be wire-based, optical fiber, wireless, or any other suitable combination thereof.

Figure 2B:
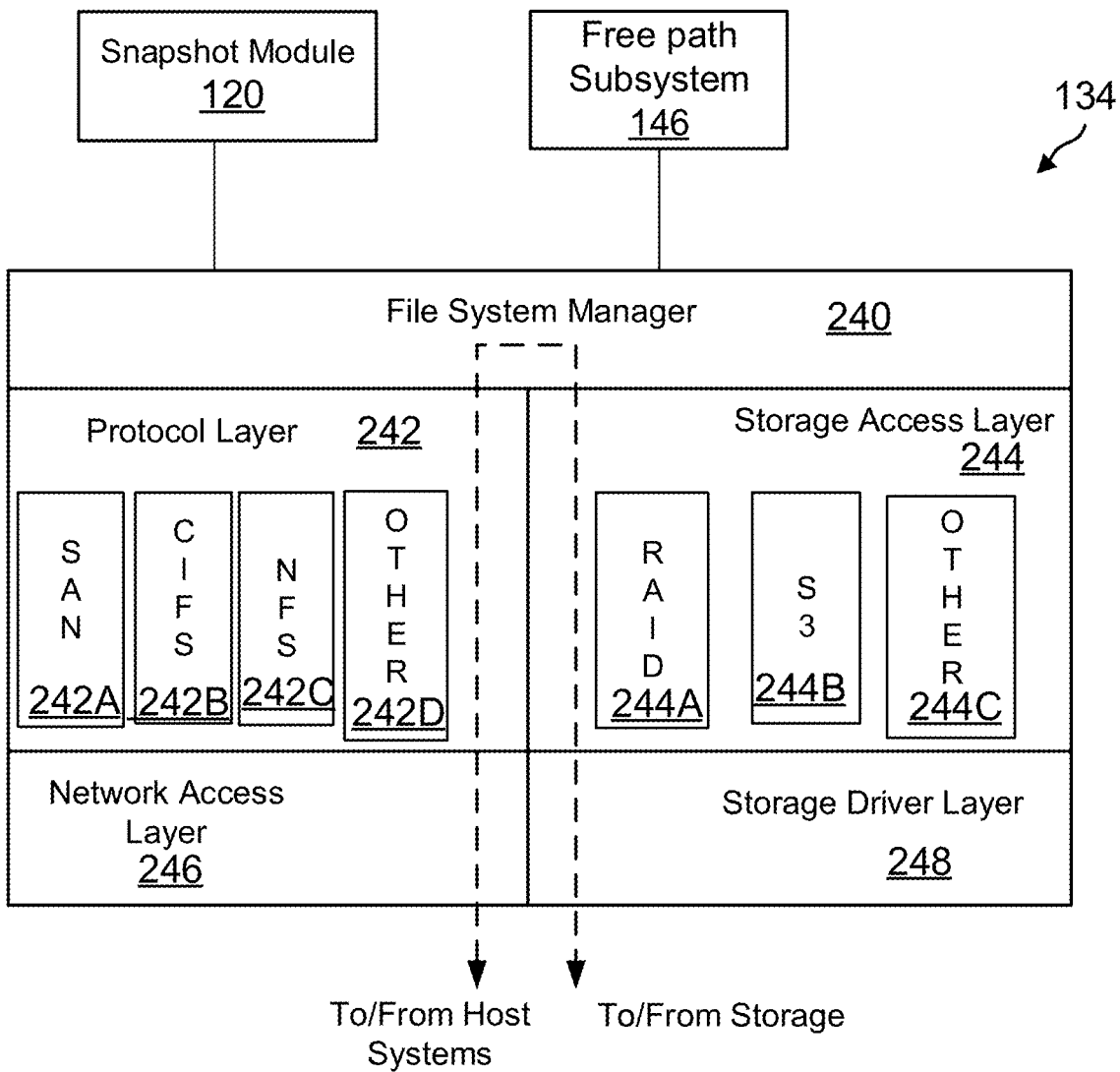
FIG. 2B shows an example of a storage operating system executed by a storage system node, according to aspects of the present disclosure.

Storage Operating System: FIG. 2B illustrates a generic example of the storage operating system 134 of FIG. 1A executed by the storage system node 108 (or nodes 208.1-208.3, FIG. 2A), according to one aspect of the present disclosure. In one example, storage operating system 134 may include several modules, or "layers" executed by one or both of network module 214 and storage module 216. These layers include a file system manager 240 that keeps track of a hierarchical structure of the data stored in storage devices 118 and manages read/write operation, i.e. executes read/write operation on storage in response to I/O requests, as described below in detail. The file system manager 240 interfaces with the snapshot module 120 for taking snapshots, as described below in detail. The file system manager 240 also interfaces with the free path subsystem 146 for managing free storage blocks (or space), as described below in detail.

Storage operating system 134 may also include a protocol layer 242 and an associated network access layer 246, to allow node 208.1 to communicate over a network with other systems, such as clients 204.1/204. N. Protocol layer 242 may implement one or more of various higher-level network protocols, such as SAN (e.g. iSCSI) (242A), CIFS (242B), NFS (242C), Hypertext Transfer Protocol (HTTP) (not shown), TCP/IP (not shown) and others (242D). The network access layer 246 may include one or more drivers, which implement one or more lower-level protocols to communicate over the network, such as Ethernet. Interactions between host systems and mass storage devices are illustrated schematically as a path, which illustrates the flow of data through storage operating system 134.

The storage operating system 134 may also include a storage access layer 244 and an associated storage driver layer 248 to allow storage module 216 to communicate with a storage device. The storage access layer 244 may implement a higher-level storage protocol, such as RAID (244A), a S3 layer 244B to access a capacity tier for object-based storage (not shown), and other layers 244C. The storage driver layer 248 may implement a lower-level storage device access protocol, such as Fibre Channel or SCSI. The storage driver layer 248 may maintain various data structures (not shown) for storing information regarding storage volume, aggregate and various storage devices.

As used herein, the term "storage operating system" generally refers to the computer-executable code operable on a computer to perform a storage function that manages data access and may, in the case of a storage system node, implement data access semantics of a general-purpose operating system. The storage operating system can also be implemented as a microkernel, an application program operating over a general-purpose operating system, such as UNIX® or Windows®, or as a general-purpose operating system with configurable functionality, which is configured for storage applications as described herein.

In addition, it will be understood to those skilled in the art that the disclosure described herein may apply to any type of special-purpose (e.g., file server, filer or storage serving appliance) or general-purpose computer, including a stand-alone computer or portion thereof, embodied as or including a storage system. Moreover, the teachings of this disclosure can be adapted to a variety of storage system architectures including, but not limited to, a network-attached storage environment, a storage area network and a storage device directly attached to a client or host computer. The term "storage system" should therefore be taken broadly to include such arrangements in addition to any subsystems configured to perform a storage function and associated with other equipment or systems. It should be noted that while this description is written in terms of a write any-where file system, the teachings of the present disclosure can be utilized with any suitable file system, including a write in place file system.

Figure 3:
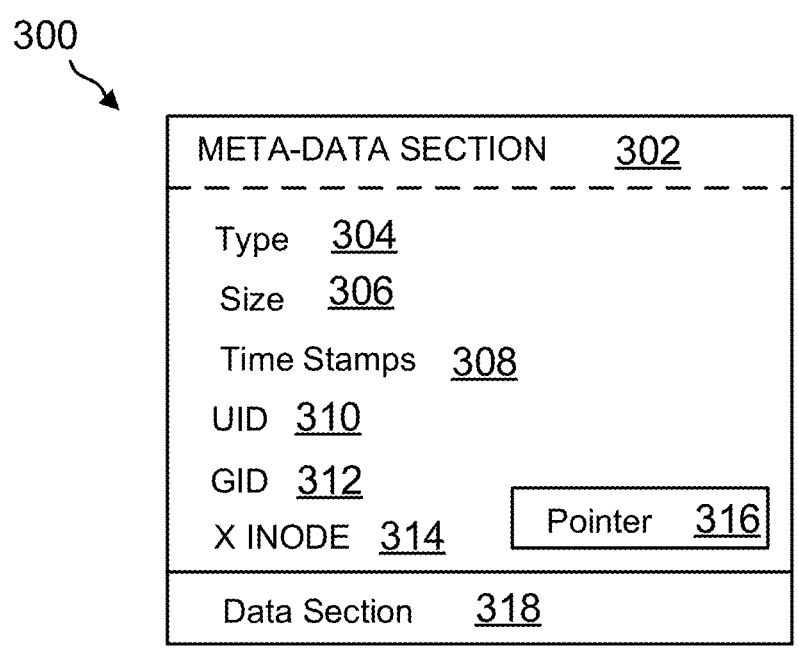
FIG. 3 shows an example of an inode used by a storage system node for storing and retrieving data from a storage device, according to aspects of the present disclosure.

Inode Structure 300: FIG. 3 shows an example of an inode structure 300 (may also be referred to as inode 300) used to store data on storage devices 118 of the storage subsystem 112, according to one aspect of the present disclosure. Inode 300 may include a meta-data section 302 and a data section 318. The information stored in the meta-data section 302 of each inode 300 describes a file and, as such, may include the file type (e.g., regular, directory or object) 304, size 306 of the file, time stamps (e.g., access and/or modification time) 308 for the file and ownership, i.e., user identifier (UID 310) and group ID (GID 312), of the file. The metadata section 302 may also include an X-inode field 314 with a pointer 316 that references another on-disk inode structure containing, e.g., access control list (ACL) information associated with the file or directory.

The contents of data section 318 of each inode 300 can be interpreted differently depending upon the type of file (inode) defined within the type field 304. For example, the data section 318 of a directory inode structure includes meta-data controlled by the file system, whereas the data section of a "regular inode" structure includes user-defined data. In the latter case, the data section 318 includes a representation of the data associated with the file. Data section 318 of a regular on-disk inode file may include user data or pointers, the latter referencing, for example, data blocks for storing user data at a storage device.

Inode structure 300 may have a restricted size (for example, 122 bytes). Therefore, user data having a size that is less than or equal to 64 bytes can be represented, in its entirety, within the data section of an inode. However, if the user data is greater than 64 bytes but less than or equal to, for example, 64 kilobytes (KB), then the data section of the inode comprises multiple pointers, e.g. 16 pointers, each of which references a block of data stored at a disk. Moreover, if the size of the data is greater than 64 kilobytes but less than or equal to 64 megabytes (MB), then each pointer in the data section 318 of the inode references an indirect inode that contains multiple pointers (e.g. 1024 pointers), each of which references a data block on disk.

Figure 4:
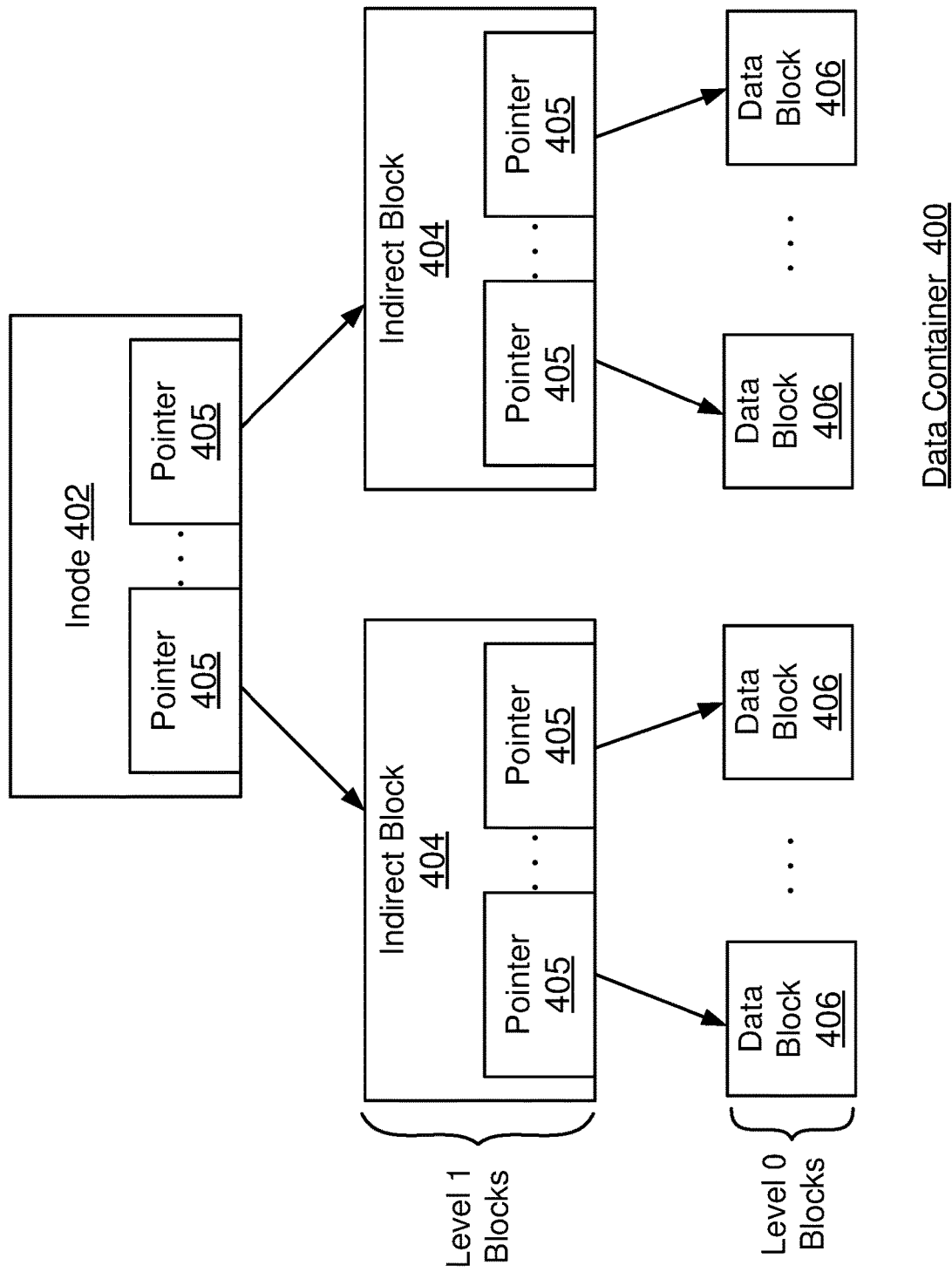
FIG. 4 shows an example of a buffer tree used by a storage operating system of a storage system node, according to aspects of the present disclosure.

Buffer Tree: FIG. 4 is an example of an inode buffer tree of a data container that can be used by the storage operating system 134. The buffer tree is an internal representation of blocks for a data container 400 loaded into the buffer cache 140 (e.g., of a storage system node 108 as illustrated in FIG. 1B/5B) and maintained by the file system manager 240. A root (top-level) inode 402, such as an embedded inode, references indirect blocks 404 (e.g., Level 1). The root inode 402 may be referenced by a FSINFO block that maybe a super block.

The indirect blocks (and inode) contain pointers 405 that ultimately reference data blocks 406 used to store the actual data of file A. That is, the data of data container 400 are contained in data blocks and the locations of these blocks are stored in the indirect blocks of the file. Each Level 1 indirect block 404 may contain pointers to a plurality of data blocks.

In one aspect, the file system manager 240 using the free path subsystem 146 allocates blocks, and frees blocks, to and from a virtual volume (may also be referred to as VVOL) of an aggregate. The aggregate, as mentioned above, is a physical volume comprising one or more groups of storage devices, such as RAID groups, underlying one or more VVOLs of the storage system. The aggregate has its own physical volume block number (PVBN) space and maintains metadata, such as block allocation bitmap structures, within that PVBN space. Each VVOL also has its own virtual volume block number (VVBN) space and maintains metadata, such as block allocation kidnap structures, within that VVBN space. Typically, PVBNs are used as block pointers within buffer trees of files (such as data container 400) stored in a VVOL.

As an example, a VVOL can be embodied as a container file in an aggregate having L0 (data) blocks that comprise all blocks used to hold data in a VVOL; that is, the L0 data blocks of the container file contain all blocks used by a VVOL. L1 (and higher) indirect blocks of the container file reside in the aggregate and, as such, are considered aggregate blocks. The container file is an internal (to the aggregate) feature that supports a VVOL; illustratively, there is one container file per VVOL. The container file is a hidden file (not accessible to a user) in the aggregate that holds every block in use by the VVOL.

When operating in a VVOL, a VVBN identifies a FBN location within the file and the file system uses the indirect blocks of the hidden container file to translate the FBN into a PVBN location within the physical volume, which block can then be retrieved from storage 118.

Figure 5A:
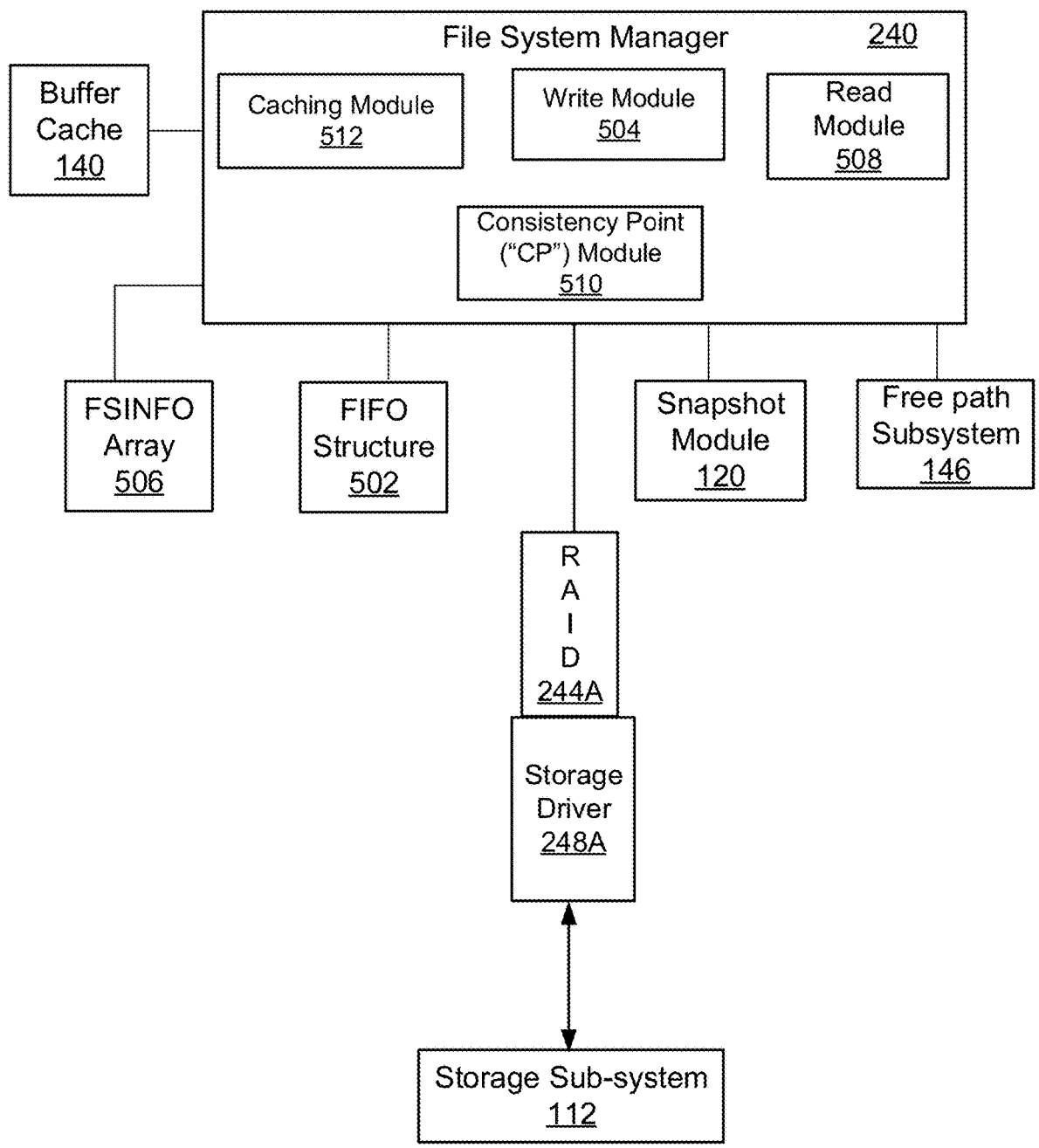
FIG. 5A shows a block diagram of a file system manager of a storage operating system, according to aspects of the present disclosure.

File System Manager 240: FIG. 5A shows a block diagram of the file system manager 240 (first introduced with respect to FIG. 2B), according to one aspect of the present disclosure. The file system manager 240 includes a write module 504 that manages write requests for writing data in storage device 118 (FIG. 1A), and a read module 508 that manages read requests for reading data from storage devices 118.

The write module 504 may include a write allocator sub-module (not shown) that allocates storage space for storing data. The write allocator interfaces with the free path subsystem 146 that maintains a list of free blocks used by a node for writing data.

The buffer cache 140 is managed by a caching module 512. A consistency CP module 510 is used to manage CP operations to flush data from the buffer cache 140 to persistent storage (e.g. storage devices 118). In one aspect, when data is to be persistently stored, the data is marked as dirty at the buffer cache 140, and then the CP module 510 flushes the dirty data from the buffer cache 140 to the storage subsystem 112 e.g. at storage devices 118. The CP module 510 may execute CP operations on a regular basis (e.g. "regular Aggr CP 1000 shown as 607A in FIG. 6D). The CP module 504 may also execute CP operations at transaction boundaries e.g. after write operations, shown as SI CP1002 603C in FIG. 6D. The VVBN to the file system structure after the CP at the transaction boundary is stored in a FIFO structure 502, as described below. This enables faster recovery to a transaction boundary, especially for databases, without having to replay extensive logs, as described below with respect to FIG. 6D.

The read module 508 is used to fetch data from the storage devices 118 at the storage subsystem 112 in response to read requests. The RAID layer 244A uses a storage driver 248A, for example a Fibre Channel driver, to access the storage devices 118 at the storage subsystem 112 to retrieve the requested data and present the data to an application that requested the data.

In one aspect, the file system manager 240 maintains a FSINFO array (e.g. 506) to store a VVBN of a FSINFO block that points to a root of a file system tree. Each time, the CP module 510 executes a CP operation to flush data to persistent storage at a transaction boundary or otherwise, the FSINFO array stores the VVBN of the FSINFO block pointing to the root the file system tree associated with the CP operation. The FSINFO array maintains X number of VVBNs that need to be saved as snapshots. The VVBNs are stored at slots (506A-506N, FIG. 5B) of the FSINFO array 506. Typically, the first slot (i.e. 506A) points to the active file system.

In one aspect, the file system manager 240 uses the FIFO structure 502 to store VBNs of blocks that have been overwritten at new storage locations. To modify an existing L0 block, the write module 504 uses a new block (e.g. L0') to write new data. The parent blocks (e.g. L1, L2 or others) are updated to point to the L0' block. The FIFO structure 502 stores the VVBN of the L0 block and the VVBN of the FSINFO block associated with the file system root, before the data was modified. Details of using the FIFO structure 502 are provided below.

Figure 5B:
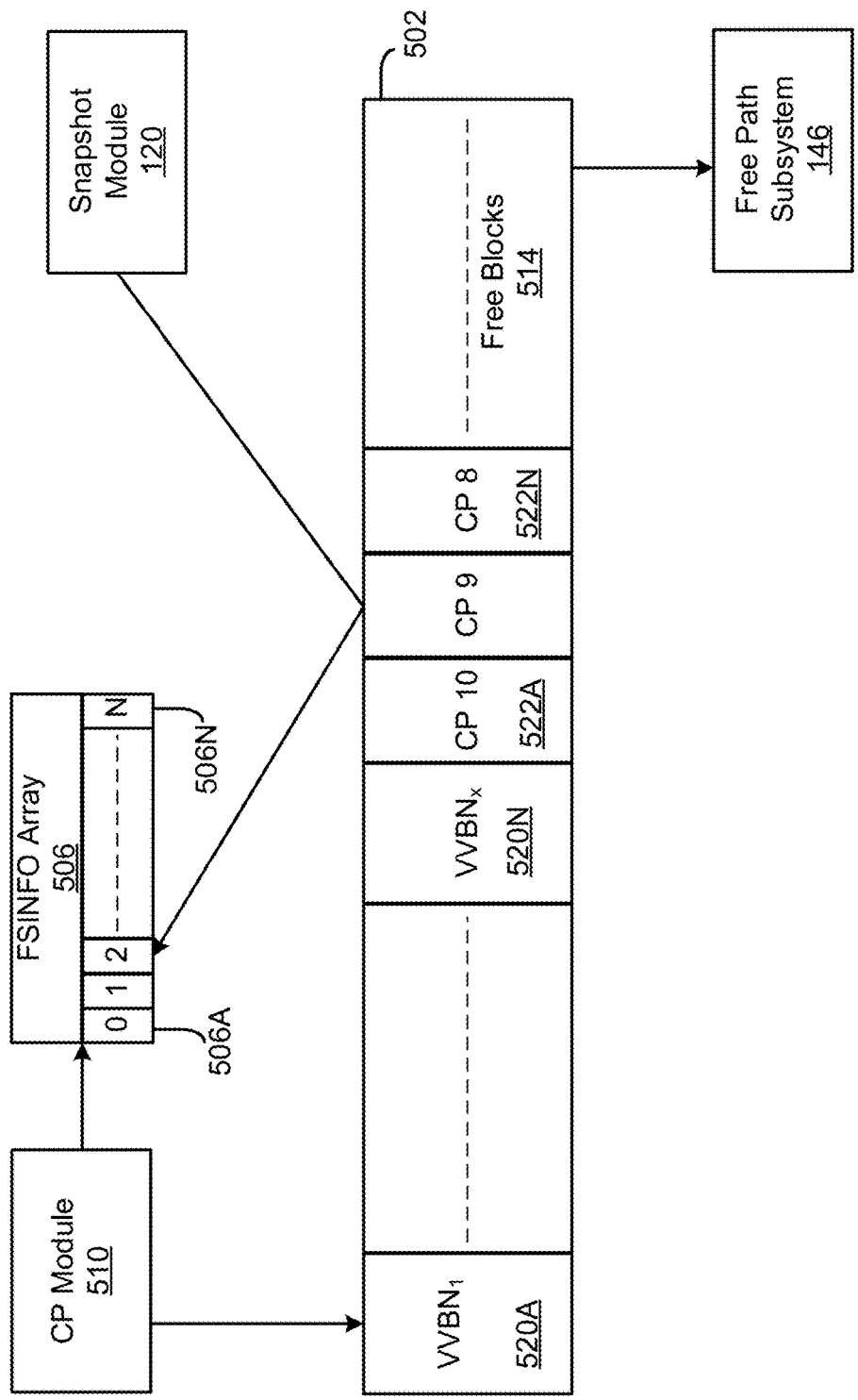
FIG. 5B shows a block diagram illustrating use of a first-in-first out (FIFO) structure for providing continuous data protection, according to aspects of the present disclosure.

FIFO Structure 502: FIG. 5B shows an example of the FIFO structure 502 configured and used, according to one aspect of the present disclosure. In one aspect, the FIFO structure 502 provides a continuous data protection window that enables a client to take a snapshot when needed and restore data containers (e.g. databases and others) while meeting recovery point objectives (RPOs) and recovery time objectives (RTO). RPO is a measurement of time from a failure, disaster or any loss-causing event. RPOs measure back in time to when data was preserved in a usable format. RTO defines a duration of time and a service level within which data must be restored after a disaster.

In one aspect, as described below, the FIFO structure 502 reduces recovery times vis-à-vis conventional techniques. In another aspect, as described below, the FIFO structure 502 can be used to recover a file system tree structure, after a ransomware attack. Furthermore, the FIFO structure 502 enables efficient synchronization between a primary volume and a secondary volume, if there has been disruption in the synchronization process. In yet another aspect, as described below, the FIFO structure 502 enables database snapshots and restore operations to be conducted at transaction boundaries without having to replay extensive transaction logs.

In one aspect, the FIFO structure 502 includes a plurality of segments. A first segment stores logical representation of blocks whose data has been overwritten by one or more write operations. The logical representation includes VVBNs 520A-520N that each point to a block whose data has been overwritten. The number of VVBNs that are stored is configurable and can be based on time. For example, VVBNs of all previous blocks overwritten in the last "X" minutes are stored Since a data write may modify a file system tree structure, VVBNs 520A-520N also include the VVBN of a FSINFO block associated with a file system tree structure, prior to the modification.

Figure 6A:
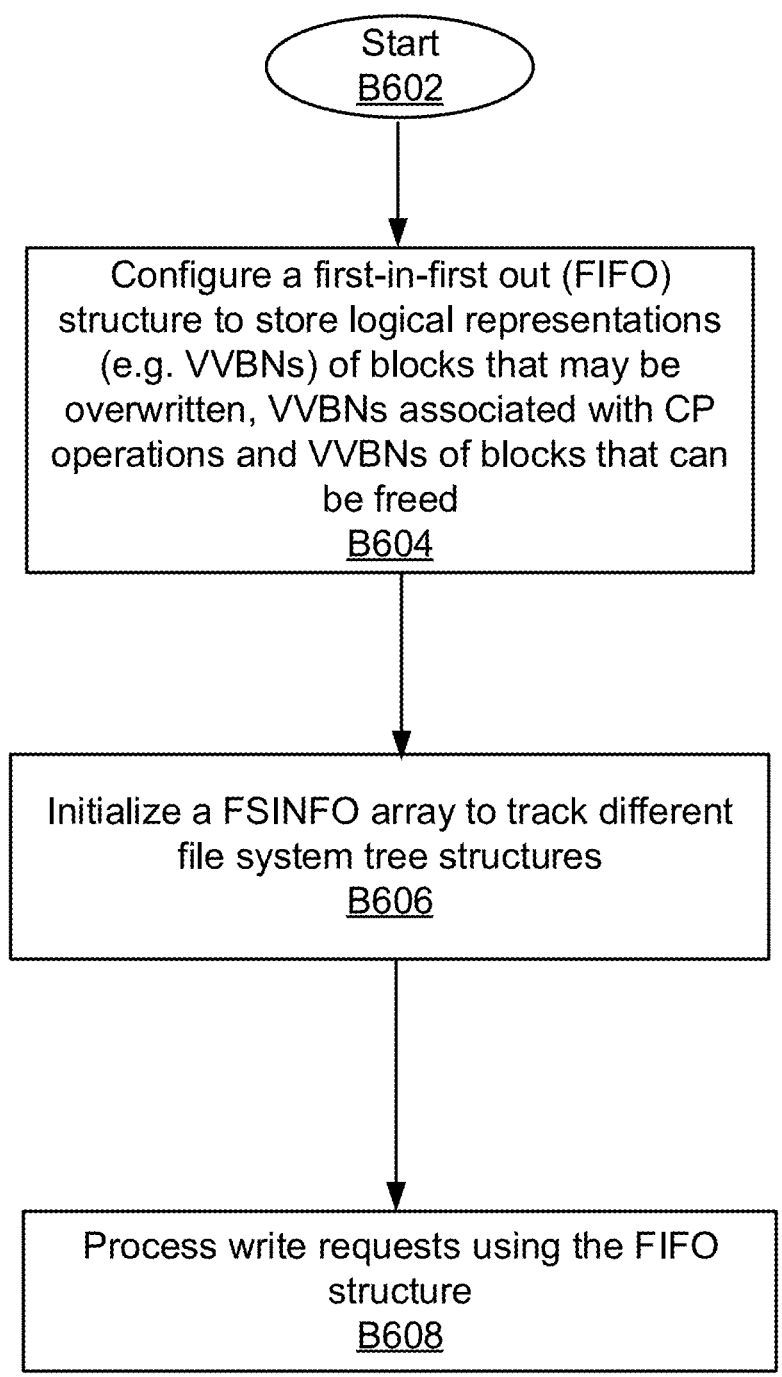
FIG. 6A shows a process for configuring the FIFO structure, according to aspects of the present disclosure.

The FIFO structure 502 includes a second segment that stores logical representation (522A-522N) of a file system tree structure that has been saved after a CP operation. In this instance, the CP operation is conducted at a transaction boundary or close to it. A transaction boundary, as illustrated in FIG. 6D, identifies the end of a write operation. As an example, the logical representation 522A-522N includes VVBNs of FSINFO blocks associated with file system trees for each CP operation, shown as CP 10 CP9 and CP 8. The file system manager 240 may not execute a CP operation after each transaction, instead, the CP operations is conducted after a configurable duration or based on a threshold that varies on a size of the FIFO structure 502. This enables a client to have access to certain number of file system tree structures, for on-demand snapshots close transaction boundaries.

In another aspect, the FIFO structure 502 includes a third segment 514 that stores VVBNs of blocks that can be released to the free path subsystem 140. The released blocks are be added to a free block list (not shown) that is used by the write module 504 to allocate a block for writing data.

In one aspect, when a CP operation is executed by the CP module 510 at a transaction boundary, the data blocks that are modified or re-written at new data blocks can be accessed from the FSINFO block VVBNs stored as 522A-522N. One or more of the FSINFO VVBNs 522A-522N may also point to the FSINFO array 506 having slots 506A-506N, shown as 0-N, if the one or more VVBN is associated with a snapshot of the file system. For example, if a snapshot is taken for CP 9, then the VVBN for the file system associated with CP 9 is also stored at the FSINFO array 506. The process blocks for using the FIFO structure 502 are described below.

Process Flows: FIG. 6A shows a process 600 for configuring the FIFO structure 502, according to one aspect of the present disclosure. Process 600 begins in block B602. In block B604, the FIFO structure 502 is configured. In one aspect, a certain portion of the FIFO structure (e.g. 514, FIG. 5B) is set aside to store VVBNs of blocks that can be released to the free path subsystem 146. Another portion of the FIFO structure is configured to store VVBNs (520A-520N, FIG. 5B) of storage locations that may have been modified and the FSINFO VVBNs for the root of the file system tree, prior to the modification. The number of VVBNs 520A-520N depends on the overall size of the FIFO structure 502, the type of storage traffic and the size of data protection window that is offered to a client. For example, a client with a certain throughput rate, may size the FIFO structure 502 to store VVBNs for 2 minutes of write transactions that are overwritten.

Furthermore, a certain portion of the FIFO structure 502 is set aside to store VVBNs (522A-522N, FIG. 5B) of the FSINFO blocks that are associated with CP operations. The CP operations can be executed at transaction boundaries. The size of the FIFO structure 502 is configurable and is based on the overall storage that is made available to a client system.

In block B606, the FSINFO array 506 is initialized. Thereafter, the file system manager 240 is ready to process write requests in block B608.

Figure 6B:
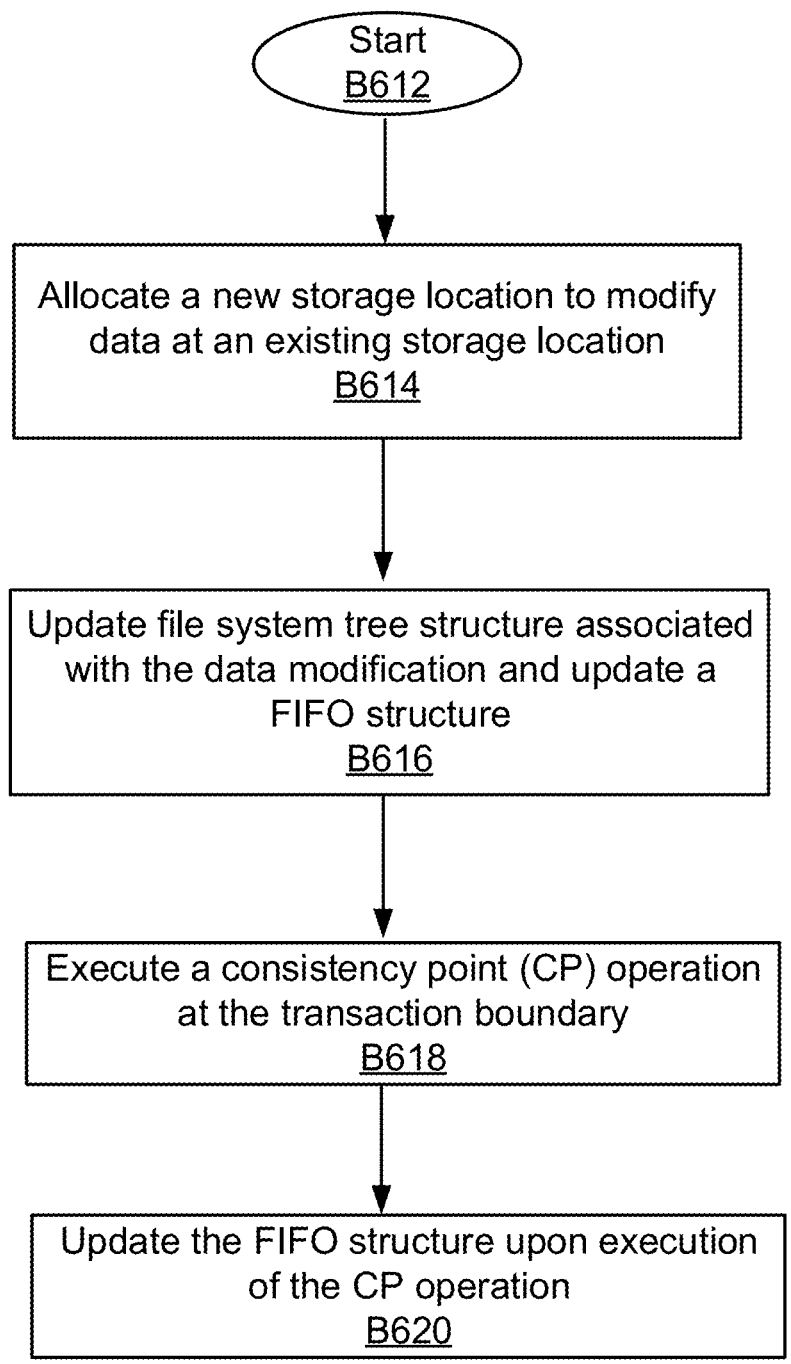
FIG. 6B shows a process for using the FIFO structure, according to aspects of the present disclosure.

FIG. 6B shows a process 610 for using the FIFO structure 502, according to one aspect of the present disclosure. Process 610 beings in block B612, after the FIFO structure 502 has been configured.

In block B614, a write request is received to modify existing data stored at a first storage location (e.g. a first L0 block of a file system tree structure (400, FIG. 4))). The file system manager 240 allocates a second storage location (e.g. a L0' block) to write the data for the write request.

In block B616, the new data is written at L0. The file system tree structure is updated, after the data is written to the L0' block. The FSINFO block is updated to point to the modified, i.e. active file system structure. The FIFO structure 502 is updated to store the VVBN of the L0 block that stored data, prior to the write request. The VVBN of a FSINFO block pointing to the file system tree structure, prior to the modification is also stored at the FIFO structure 502.

In block B618, the CP module 510 executes a CP operation to flush the data from the buffer cache 140 to storage 118. The CP operation is executed at the transaction boundary i.e. immediately after the write request of block B614 is processed.

In block B620, the FIFO structure 502 is updated with the VVBN to point to the root of the file system tree structure, after the CP operation of block B618. The FSINFO array 506 may also updated to store a pointer to the file system associated with the CP operation i.e. the file system tree structure that includes the data at block L0'.

In conventional systems, the block L0 is typically released to the free path subsystem 146, after L0' is written. In one aspect, in contrast to conventional technology, in block B616, block L0 whose data is modified by writing the new data at the L0' block is retained. The VVBN of the L0 block is stored at the FIFO structure 502, as shown in FIG. 5B. The VVBN for the FSINFO block associated with the file system tree structure, prior to the data being written to the L0' block is also retained at the FIFO structure 502.

Figure 6C:
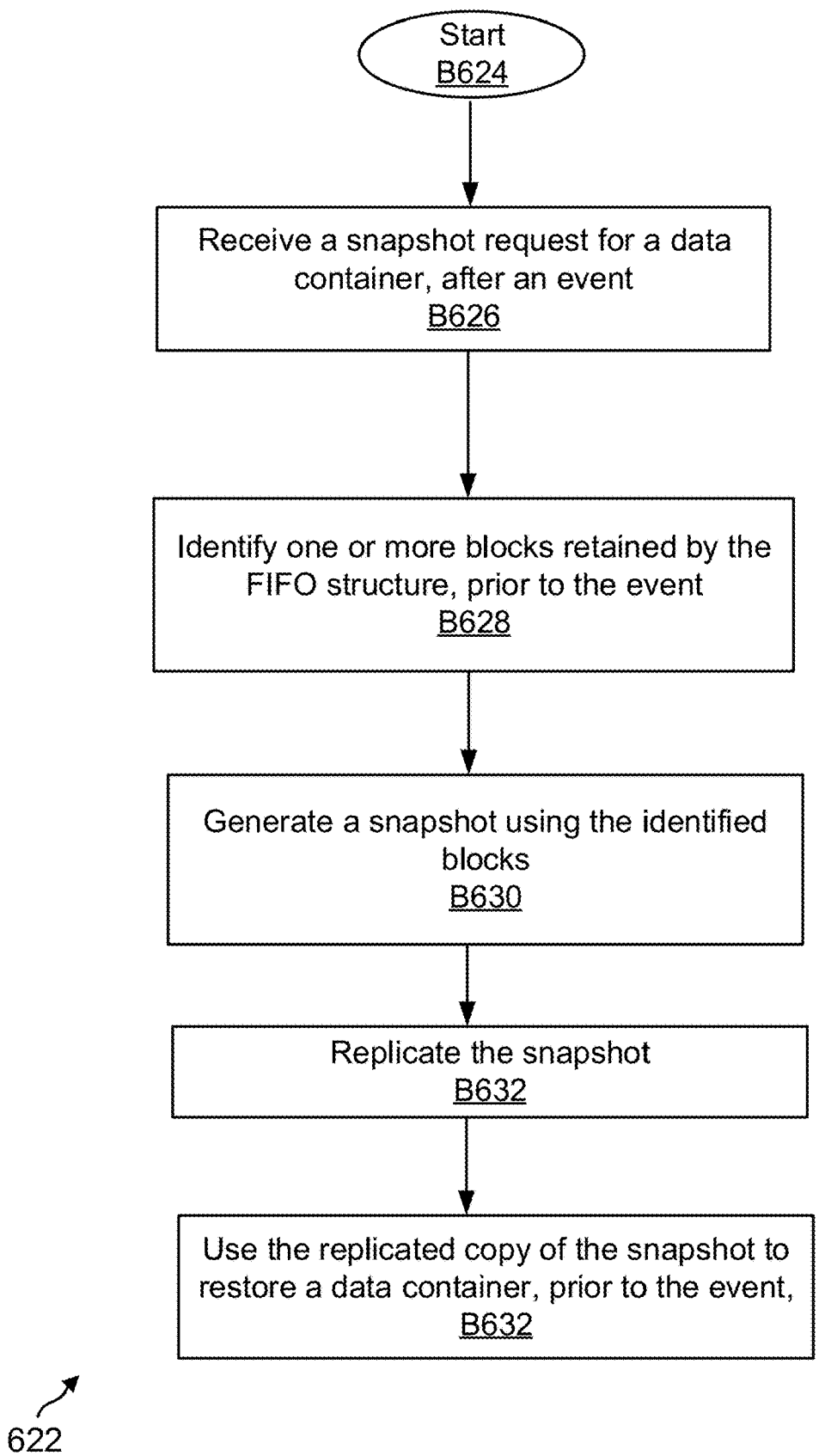
FIG. 6C shows a process for providing continuous data protection, according to aspects of the present disclosure.
Figure 6D:
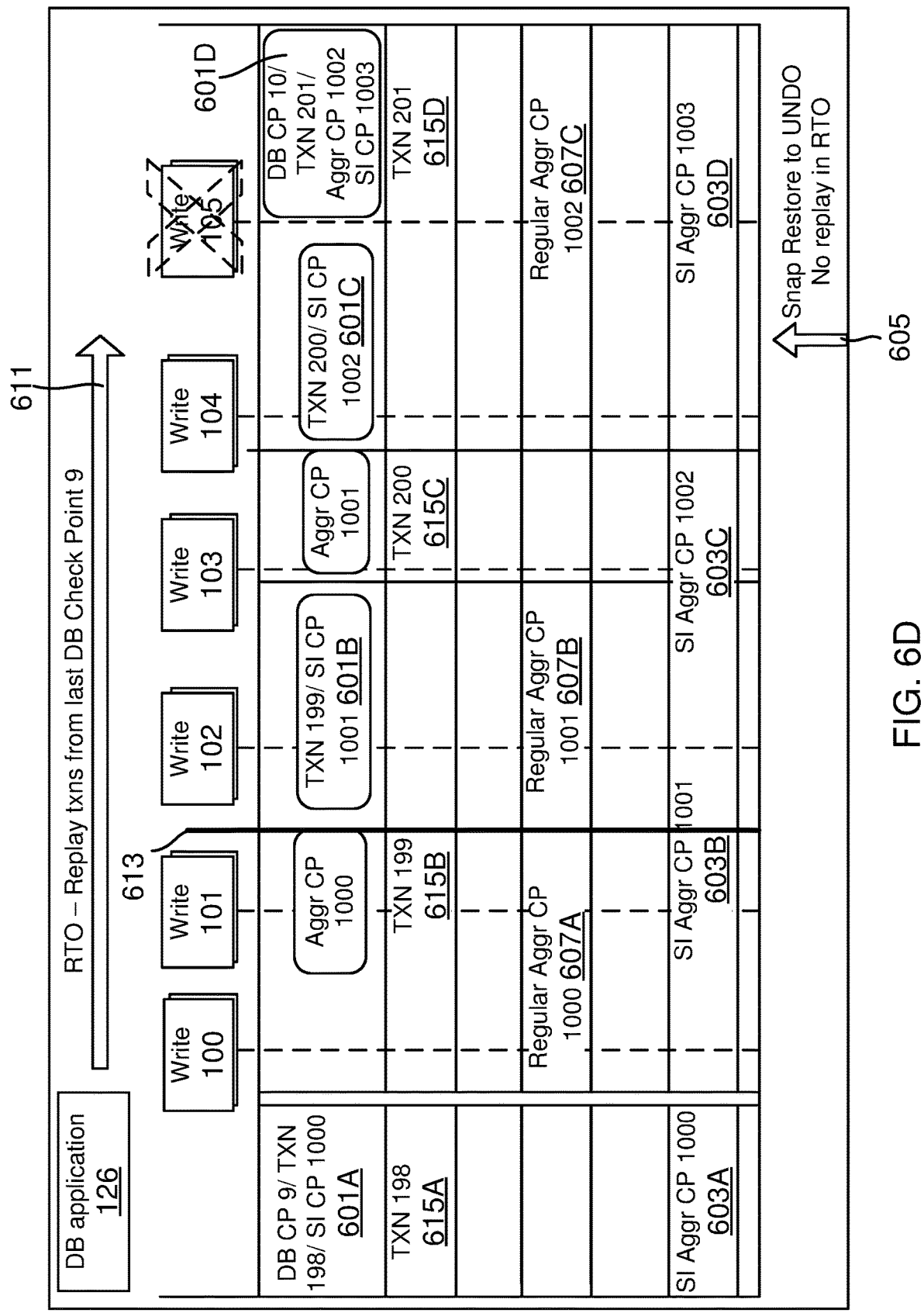
FIG. 6D provides an example of restoring a database to a transaction boundary without extensive log replay, according to aspects of the present disclosure.

FIG. 6C shows a process 622 for providing a continuous data protection window using the FIFO structure 502, according to one aspect of the present disclosure. It is noteworthy that process 622 can be used in conjunction with conventional, schedule-based snapshots i.e. snapshot module 120 can continue to take snapshots, based on a schedule. Process 622 provides additional data protection options, especially after an event. The process begins in block B624, when data blocks that may have been modified are retained using the process 610 of FIG. 6B. One or more CP operations may also have been executed at transaction boundaries.

In block B626, a snapshot request is received by the snapshot module 120. In one aspect, the snapshot request is received after an event. For example, the event may involve a ransomware attack. The event may involve a disruption during a synchronization operation when data of a primary volume is synchronized with a secondary volume. The event can be based on a transaction for a database operation i.e. the request is associated with a specific transaction, e.g. a write operation.

In block B628, the data blocks associated with a transaction prior to the request are identified. In one aspect, one or more data block whose VVBN is retained in the FIFO structure 502 are identified. The FSINFO block for a file system tree structure, prior to a modification, is also identified. Furthermore, if the request involves blocks from an active file system, then those blocks are also identified from the FSINFO array 506. As mentioned above, when a block of a file system tree structure is changed, a modified file system tree structure is created. The modified file system tree structure becomes the active file system structure that has the new block and unmodified blocks from the unmodified file system structure. In another aspect, the data blocks for the request may also be included within a file system structure that was flushed during a CP operation at a transaction boundary. In yet another aspect, the identified blocks may include the CP based tree structure, the retained blocks in the FIFO structure 502 and blocks from the active file system, when the request was received.

In block B630, a snapshot is generated by the snapshot module 120 for the identified blocks. The snapshot may include data from blocks that are logically represented in the FIFO structure 502 and blocks from the active file system. In another aspect, depending upon when a CP operation was executed with respect to the request, the snapshot may include a file system structure for which the CP operation was executed at the transaction boundary or close to the transaction boundary.

The snapshot can be replicated in block B632, for example, cloned. The cloned copy can be used in block B632 to restore a data container (e.g. a database). In one aspect, because blocks that are overwritten are retained in the FIFO structure 502, the data container can be restored to a specific transaction, as shown in FIG. 6D.

In FIG. 6D, incoming write operations are shown as write 100, write 101, write 102, write 103, write 105 and write 105. The write operations can be grouped by transactions 615A-615D. For example, transaction 198 is shown as 615A, transaction 199 is shown as 615B, transaction 200 is shown as 615C and transaction 210 as 615D. Transaction 199 may include write 100, write 101 and write 102, transaction 200 may include write 103 and write 104, and transaction 201 may include write 105.

The CP module 510 executes regular CP operations shown as 607A-607C and labelled as CP 1000, 1001 and CP 1002. These CP operations may or may not be at transactional boundaries. CP operations at transaction boundaries are shown as SI CP 1000 603A, SI CP 1001 603B, SI CP 1002 603C and SP CP 1003 603D. For example, SI CP 1001 is executed at the transaction boundary shown as 613.

Block 601A shows that a database CP operation (CP9) was conducted by the database application 126, while block 601D shows that the next database CP operation, CP10 was executed by the database application 126.

If an event occurred during write 105, and one were to restore the database prior to write 105 using conventional snapshot technology, one will have to go all the way back to DB CP 9 and replay all the transaction logs that are indicated by arrow 611. The recovery time for this replay may not be desirable because it will delay restoring the database.

By using the process of FIG. 6B and the FIFO structure 502, one can select CP 1002 (shown by arrow 605), take a snapshot of the file system from CP 1002 and restore the database at the transaction boundary, without having to replay logs using the conventional techniques. CP 1002 is selected because it is the closest to write 104, the transaction boundary before write 105, to which the database needs to be restored.

In another aspect, assume that a ransomware event occurred during write 105. To restore the database prior to the event, one will again use CP 1002 to restore the database, prior to the ransomware event.

In yet another aspect, assume the event occurs during write 105 and results in disruption of a synchronization operation that synchronizes the database at a primary volume and a secondary volume. To restart the synchronization, one will simply select CP1002 and copy the data to the secondary volume.

It is noteworthy that a CP operation may not be available at an exact transaction boundary. For example, assume that CP 1002 is unavailable and instead, the system has to select CP 1001. In this case, the system will have to replay the logs associated with write 103 and 104, instead of replaying logs from DB9. This is more efficient than conventional data protection solutions.

Figure 6E:
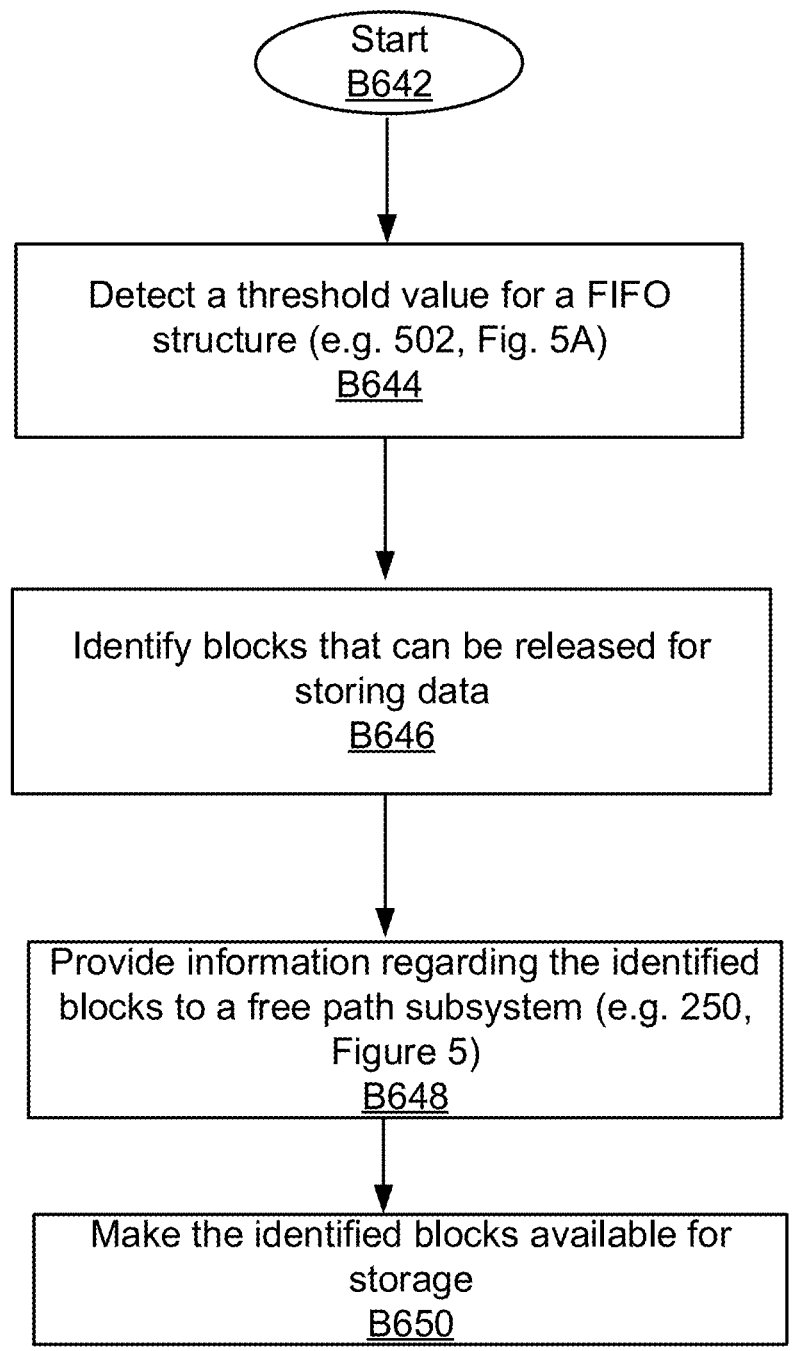
FIG. 6E shows a process for using the FIFO structure to provide continuous data protection, according to aspects of the present disclosure.

FIG. 6E shows a process 640 for using the FIFO structure 502 to free blocks, according to one aspect of the present disclosure. The process begins in block B642, when FIFO structure 502 has been used to store VVBNs of retained data blocks, and VVBNs of FSINFO block for CP operations, as shown in FIG. 5B.

In block B644, the file system manager 240 determines if a threshold value for the FIFO structure 502 has been reached. The threshold value can be based on a duration indicating how long a VVBN for a specific block has been stored within segment 514 of FIFO structure 502. In another aspect, the threshold value is based on the amount of space occupied by the various VVBNs in the FIFO structure 502.

In block B646, the file system manager 240 identifies the blocks that can be released. In one aspect, since the FIFO structure 502 is configured as a first-in-first out structure, the blocks that are the oldest are released first.

In block B648, the VVBNs for the identified blocks are provided to the free path subsystem 250. In block B650, the free path subsystem 250 makes the identified blocks available for storage. In one aspect, a free block list is maintained by the free path subsystem 250 to identify all the free blocks that can be allocated to write date.

In one aspect, data protection methods and systems for a storage environment are provided. A FIFO structure (502) stores a logical representation (520A-520N) of a first storage location that retains previous data for a data container, after new data for the data container is stored at a second storage location. The FIFO structure also stores a logical representation (522A-522N) of a file system tree structure that is stored in persistent storage, after a consistent point operation. In response to an event, the file system tree structure is selected, based on the file system structure being closest to a transaction. A snapshot is generated using the file system tree structure. Thereafter, the data container is restored from the snapshot or from a copy of the snapshot.

In another aspect, a method is provided. The method includes retaining, by a processor, in a FIFO structure (502), a logical representation of a first storage location that stores previous data for a data container, prior to writing new data for the data container at a second storage location; utilizing, by the processor, the FIFO structure to point to a previous version of a file system tree structure stored at persistent storage, before the previous data is written at the first storage location; selecting, by the processor, the previous version of the file system tree structure to restore the data container to a transaction, based on a proximity of the previous version of the file system tree structure to the transaction; executing, by the processor, a snapshot operation for taking a snapshot of the previous version of the file system tree structure; and utilizing, by the processor, the snapshot to restore the data container.

Figure 7:
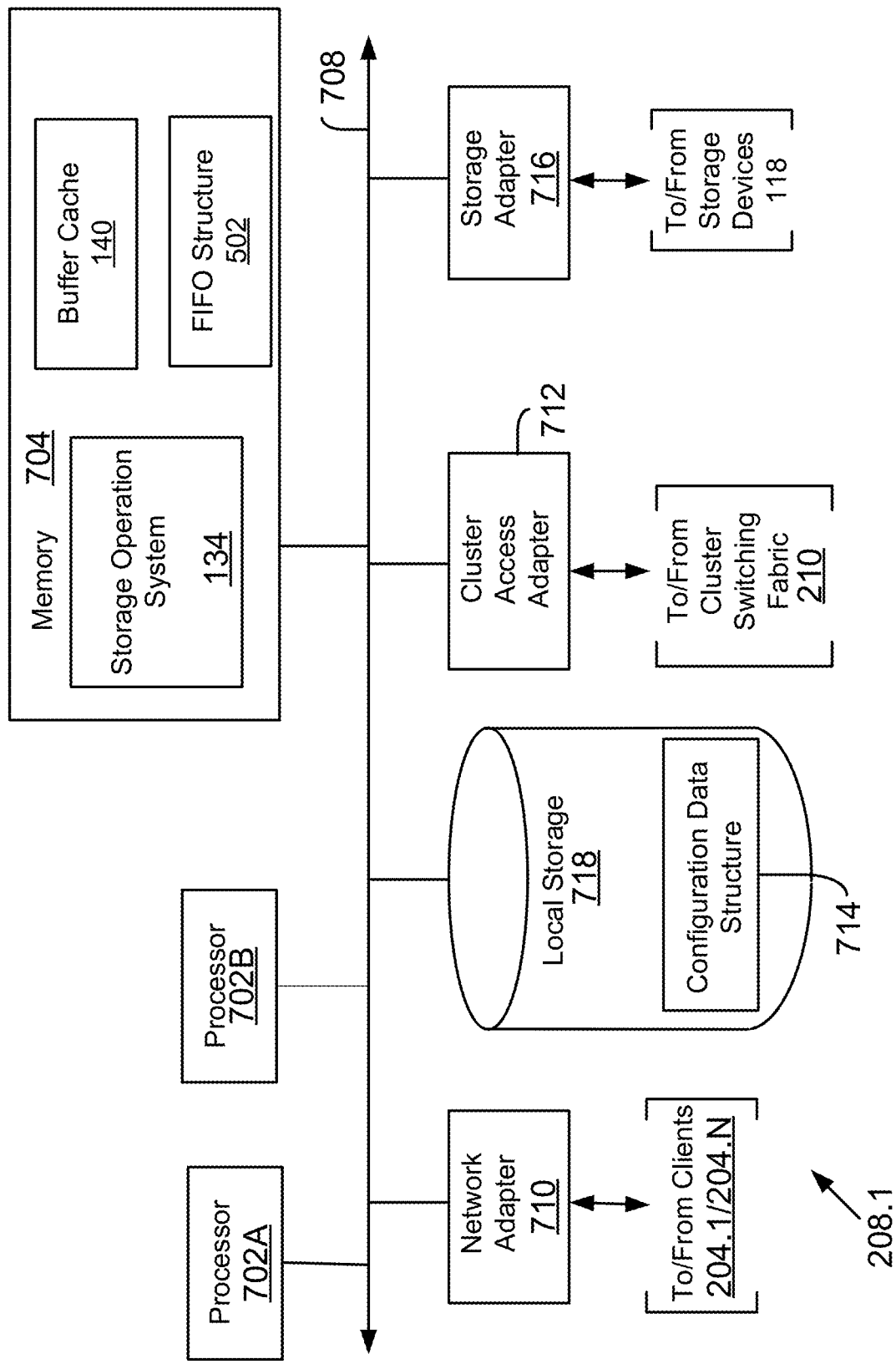
FIG. 7 shows an example of a storage system node, used according to aspects of the present disclosure.

Storage System Node: FIG. 7 is a block diagram of a node 208.1, (including the storage system nodes 108A/108B) that is illustratively embodied as a storage system comprising of a plurality of processors 702A and 702B, a memory 704, a network adapter 710, a cluster access adapter 712, a storage adapter 716 and local storage 718 interconnected by a system bus 708.

As an example, processors 702A-702B may include, one or more programmable general-purpose or special-purpose microprocessors, digital signal processors (DSPs), programmable controllers, application specific integrated circuits (ASICs), programmable logic devices (PLDs), or the like, or a combination of such hardware devices.

The local storage 718 comprises one or more storage devices utilized by the node to locally store configuration information for example, in a configuration data structure 714.

The cluster access adapter 712 comprises a plurality of ports adapted to couple node 208.1 to other nodes of cluster 202 (FIG. 2A). In the illustrative aspect, Ethernet can be used as the clustering protocol and interconnect media, although it will be apparent to those skilled in the art that other types of protocols and interconnects can be utilized within the cluster architecture described herein. In alternate aspects where the network modules and storage modules are implemented on separate storage systems or computers, the cluster access adapter 712 is utilized by the network/storage module for communicating with other network/storage-modules in the cluster 202.

Each node 208.1 is illustratively embodied as a dual processor storage system executing the storage operating system 134 that preferably implements a high-level module, such as a file system manager 240, to logically organize the information as a hierarchical structure of named directories and files at storage 118. However, it will be apparent to those of ordinary skill in the art that the node 208.1 may alternatively comprise a single or more than two processor systems. Illustratively, one processor 702A executes the functions of the network module on the node, while the other processor 702B executes the functions of the storage module.

The memory 704 illustratively comprises storage locations that are addressable by the processors and adapters for storing programmable instructions and data structures including FIFO structure 502. The processor and adapters may, in turn, comprise processing elements and/or logic circuitry configured to execute the programmable instructions and manipulate the data structures. It will be apparent to those skilled in the art that other processing and memory means, including various computer readable media, can be used for storing and executing program instructions pertaining to the disclosure described herein.

The storage operating system 134 portions of which is typically resident in memory and executed by the processing elements, functionally organizes the node 208.1 by, inter alia, invoking storage operation in support of the storage service implemented by the node.

The network adapter 710 comprises a plurality of ports adapted to couple the node 208.1 to one or more clients 204.1/204.N over point-to-point links, wide area networks, virtual private networks implemented over a public network (Internet) or a shared local area network. The network adapter 710 thus may comprise the mechanical, electrical and signaling circuitry needed to connect the node to the network. Each client 204.1/204.N may communicate with the node over network 206 (FIG. 2A) by exchanging discrete frames or packets of data according to pre-defined protocols, such as TCP/IP.

The storage adapter 716 cooperates with the storage operating system 134 executing on the node 208.1 to access information requested by the clients. The information can be stored on any type of attached array of writable storage device media such as hard drives, solid state drivers, storage class memory, video tape, optical, DVD, magnetic tape, bubble memory, electronic random access memory, micro-electro mechanical and any other storage media adapted to store information, including data and parity information. However, as illustratively described herein, the information is preferably stored at storage device 118. The storage adapter 716 comprises a plurality of ports having input/output (I/O) interface circuitry that couples to the storage devices over an I/O interconnect arrangement, such as a conventional high-performance, Fibre Channel link topology. In one aspect, if an error prevents the storage adapter 716 to access storage device 118, then the node 208.1 may become unresponsive and trigger a takeover operation.

Figure 8:
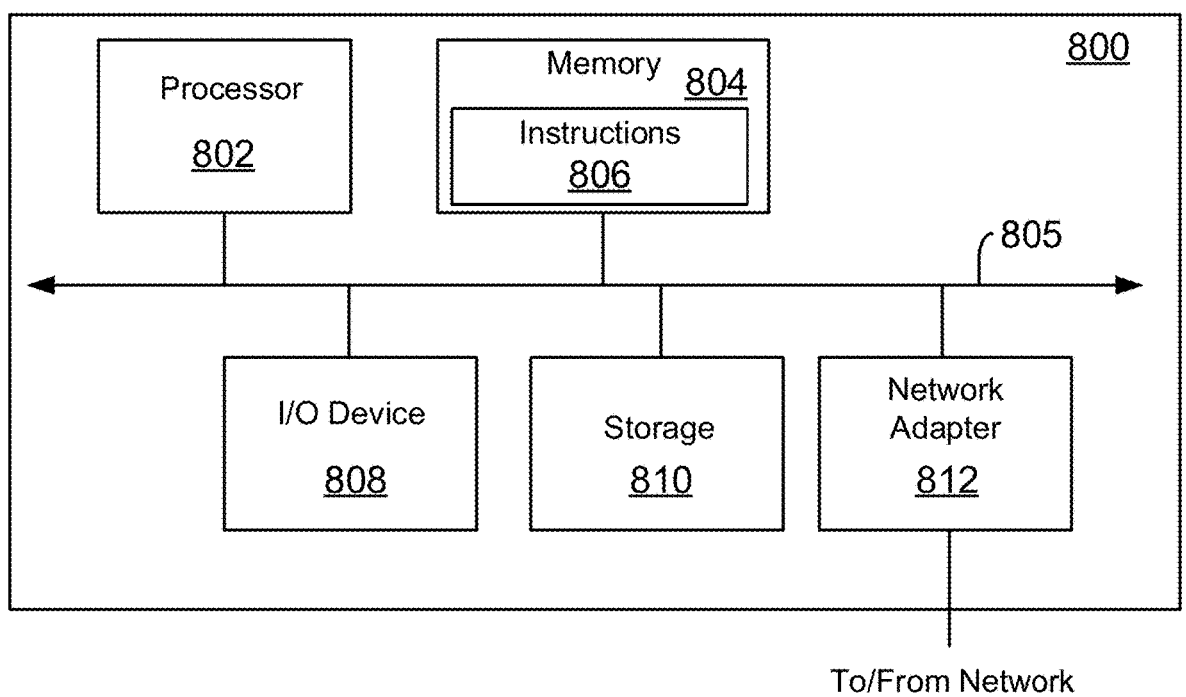
FIG. 8 shows an example of a processing system, used according to aspects of the present disclosure.

Processing System: FIG. 8 is a high-level block diagram showing an example of the architecture of a processing system 800 that can be used according to one aspect of the present disclosure. The processing system 800 can represent the storage system node 108, host system 102, management console 132, or clients 116, 204. Note that certain standard and well-known components which are not germane to the present aspects are not shown in FIG. 8.

The processing system 800 includes one or more processor(s) 802 and memory 804, coupled to a bus system 805. The bus system 805 shown in FIG. 8 is an abstraction that represents any one or more separate physical buses and/or point-to-point connections, connected by appropriate bridges, adapters and/or controllers. The bus system 805, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor(s) 802 are the central processing units (CPUs) of the processing system 800 and, thus, control its overall operation. In certain aspects, the processors 802 accomplish this by executing software stored in memory 804. The processors 802 may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 804 represents any form of random-access memory (RAM), read-only memory (ROM), flash memory, or the like, or a combination of such devices. Memory 804 includes the main memory of the processing system 800. Instructions 806 can be used to implement the FIFO structure 502, and process blocks of FIGS. 6A-6E described above, may reside in and executed (by processors 802) from memory 804.

Also connected to the processors 802 through the bus system 805 are one or more internal mass storage devices 810, and a network adapter 812. Internal mass storage devices 810 may include any conventional medium for storing large volumes of data in a non-volatile manner, such as one or more magnetic or optical based disks, solid state drives, or any other storage media. The network adapter 812 provides the processing system 800 with the ability to communicate with remote devices (e.g., storage servers) over a network and can be, for example, an Ethernet adapter, a Fibre Channel adapter, or the like.

The processing system 800 also includes one or more input/output (I/O) devices 808 coupled to the bus system 805. The I/O devices 808 may include, for example, a display device, a keyboard, a mouse, etc.

Cloud Computing: The system and techniques described above are applicable and useful in the cloud computing environment. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud. After the application layer, is a cloud platform and cloud infrastructure, followed by a "server" layer that includes hardware and computer software designed for cloud specific services, for example, the storage system 108 is accessible as a cloud service. Details regarding these layers are not germane to the embodiments disclosed herein.

Thus, methods and systems for data protection in a networked storage environment have been described. Note that references throughout this specification to "one aspect" (or "embodiment") or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to can be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method, comprising:
   retaining, by a processor, in a first-in-first out (FIFO) structure, a logical representation of a first storage location that stores previous data for a data container, prior to writing new data for the data container at a second storage location;
   utilizing, by the processor, the FIFO structure to point to a previous version of a file system tree structure stored at persistent storage, before the previous data is written at the first storage location;
   selecting, by the processor, the previous version of the file system tree structure to restore the data container to a transaction, based on a proximity of the previous version of the file system tree structure to the transaction;
   executing, by the processor, a snapshot operation for taking a snapshot of the previous version of the file system tree structure; and
   utilizing, by the processor, the snapshot to restore the data container.

2. The method of claim 1, wherein the data container is a database.

3. The method of claim 1, further comprising: updating, by the processor, an active file system tree structure upon writing the new data.

4. The method of claim 3, further comprising: selecting, by the processor, the previous data at the first storage location and data blocks within the updated active file system tree structure for the snapshot, based on the proximity of the previous data to the transaction.

5. The method of claim 1, further comprising:
   storing in the FIFO structure, by the processor, indicators for free blocks that are available for storage by a file system.

6. The method of claim 5, wherein a number of free blocks is based on a size of the FIFO structure.

7. The method of claim 5, wherein a number of free blocks is based on a duration of how long the free blocks have been stored at the FIFO structure.

8. A non-transitory, machine readable storage medium having stored thereon instructions comprising machine executable code, which when executed by a machine, causes the machine to:
   store in a first-in-first out (FIFO) structure a logical representation of a first storage location that retains previous data for a data container, after new data for the data container is stored at a second storage location;
   store in the FIFO structure, a logical representation of a file system tree structure stored in persistent storage after a consistent point operation;
   in response to an event, select the file system tree structure from the FIFO structure, based on the file system tree structure being closest to a transaction;
   generate a snapshot using the file system tree structure; and
   restore the data container from the snapshot.

9. The non-transitory, machine readable storage medium of claim 8, wherein in addition to the file system tree structure, select the first storage location for the snapshot.

10. The non-transitory, machine readable storage medium of claim 8, wherein the event is a ransomware related event.

11. The non-transitory, machine readable storage medium of claim 8, wherein the event is disruption during a synchronization operation, when data from a primary storage is being copied to a secondary storage.

12. The non-transitory, machine readable storage medium of claim 8, wherein the data container is a database and the transaction is a write operation to write to the second storage location.

13. The non-transitory, machine readable storage medium of claim 8, wherein the FIFO structure stores logical representation of free blocks that are to be made available for storage.

14. The non-transitory, machine readable storage medium of claim 13, wherein a number of free blocks is based on a duration of how long the free blocks have been stored at the FIFO structure.

15. A system, comprising:
- a memory containing machine readable medium comprising machine executable code having stored thereon instructions; and a processor coupled to the memory to execute the machine executable code to:
- store in a first-in-first out (FIFO) structure a logical representation of a first storage location that retains previous data for a data container, after new data for the data container is stored at a second storage location;
- store in the FIFO structure, a logical representation of a file system tree structure stored in persistent storage after a consistent point operation;
- in response to an event, select the file system tree structure from the FIFO structure, based on the file system tree structure being closest to a transaction;
- generate a snapshot using the file system tree structure; and
- restore the data container from the snapshot.

16. The system of claim 15, wherein in addition to the file system tree structure, select the first storage location for the snapshot.

17. The system of claim 15, wherein the event is a ransomware related event.

18. The system of claim 15, wherein the event is disruption during a synchronization operation, when data from a primary storage is being copied to a secondary storage.

19. The system of claim 15, wherein the data container is a database and the transaction is a write operation to write to the second storage location.

20. The system of claim 15, wherein the FIFO structure stores logical representation of free blocks that are to be made available for storage.

* * * * *